United States Patent
Shelton et al.

(10) Patent No.: US 10,606,872 B1
(45) Date of Patent: Mar. 31, 2020

(54) GRAPHICAL USER INTERFACE FOR A DATABASE SYSTEM

(71) Applicant: Palantir Technologies Inc., Palo Alto, CA (US)

(72) Inventors: Michael Shelton, New York, NY (US); Radu-Andrei Szasz, London (GB); Walker Burgin, Seattle, WA (US); Zhen Dai, Brooklyn, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 212 days.

(21) Appl. No.: 15/677,977

(22) Filed: Aug. 15, 2017

Related U.S. Application Data

(60) Provisional application No. 62/509,634, filed on May 22, 2017.

(51) Int. Cl.
| | |
|---|---|
| *G06F 17/30* | (2006.01) |
| *G06F 16/332* | (2019.01) |
| *G06F 3/048* | (2013.01) |
| *G06F 16/48* | (2019.01) |
| *G06F 16/33* | (2019.01) |
| *G06F 16/2457* | (2019.01) |

(52) U.S. Cl.
CPC .......... *G06F 16/3328* (2019.01); *G06F 3/048* (2013.01); *G06F 16/24578* (2019.01); *G06F 16/3349* (2019.01); *G06F 16/489* (2019.01)

(58) Field of Classification Search
USPC .......................................... 707/768; 715/234
See application file for complete search history.

(56) References Cited

U.S. PATENT DOCUMENTS

| | | |
|---|---|---|
| 6,101,479 A | 8/2000 | Shaw |
| 6,430,305 B1 | 8/2002 | Decker |
| 6,820,135 B1 | 11/2004 | Dingman |
| 6,978,419 B1 | 12/2005 | Kantrowitz |
| 6,980,984 B1 | 12/2005 | Huffman et al. |
| 7,168,039 B2 | 1/2007 | Bertram |
| 7,617,232 B2 | 11/2009 | Gabbert et al. |
| 7,756,843 B1 | 7/2010 | Palmer |
| 7,899,796 B1 | 3/2011 | Borthwick et al. |

(Continued)

FOREIGN PATENT DOCUMENTS

| | | |
|---|---|---|
| CN | 102546446 | 7/2012 |
| CN | 103167093 | 6/2013 |

(Continued)

OTHER PUBLICATIONS

Amnet, "5 Great Tools for Visualizing Your Twitter Followers," posted Aug. 4, 2010, http://www.amnetblog.com/component/content/article/1 15-5-grate-tools-for-visualizing-your-twitter-followers.html.

(Continued)

*Primary Examiner* — Hung T Vy
(74) *Attorney, Agent, or Firm* — Knobbe, Martens, Olson & Bear, LLP

(57) ABSTRACT

Systems and methods are provided for improved interactive graphical user interfaces. The system allows users to visually construct queries of a database. The system can dynamically generate visual representations of supplemental data and cumulative data. Users can share annotations related to user input queries via the graphical user interface.

13 Claims, 10 Drawing Sheets

(56) References Cited

U.S. PATENT DOCUMENTS

| | | |
|---|---|---|
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,392,556 B2 | 3/2013 | Goulet et al. |
| 8,473,454 B2 | 6/2013 | Evanitsky et al. |
| 8,484,115 B2 | 7/2013 | Aymeloglu et al. |
| 8,589,273 B2 | 11/2013 | Creeden et al. |
| 8,688,573 B1 | 4/2014 | Ruknoic et al. |
| 8,744,890 B1 | 6/2014 | Bernier |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,100,428 B1 | 8/2015 | Visbal |
| 9,129,219 B1 | 9/2015 | Robertson et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2003/0036848 A1 | 2/2003 | Sheha et al. |
| 2003/0061132 A1 | 3/2003 | Mason et al. |
| 2003/0126102 A1 | 7/2003 | Borthwick |
| 2003/0172014 A1 | 9/2003 | Quackenbush et al. |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0143034 A1 | 6/2006 | Rothermel |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga |
| 2007/0185867 A1 | 8/2007 | Maga |
| 2007/0284433 A1 | 12/2007 | Domenica et al. |
| 2008/0040275 A1 | 2/2008 | Paulsen et al. |
| 2008/0069081 A1 | 3/2008 | Chand et al. |
| 2008/0103996 A1 | 5/2008 | Forman et al. |
| 2008/0222295 A1 | 9/2008 | Robinson et al. |
| 2008/0243711 A1 | 10/2008 | Aymeloglu et al. |
| 2008/0249983 A1 | 10/2008 | Meisels et al. |
| 2008/0255973 A1 | 10/2008 | El Wade et al. |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0187546 A1 | 7/2009 | Whyte et al. |
| 2009/0187548 A1 | 7/2009 | Ji et al. |
| 2009/0249244 A1 | 10/2009 | Robinson et al. |
| 2009/0271343 A1 | 10/2009 | Vaiciulis et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070842 A1 | 3/2010 | Aymeloglu et al. |
| 2010/0076813 A1 | 3/2010 | Ghosh et al. |
| 2010/0098318 A1 | 4/2010 | Anderson |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0235915 A1 | 9/2010 | Memon et al. |
| 2010/0262688 A1 | 10/2010 | Hussain et al. |
| 2010/0312837 A1 | 12/2010 | Bodapati et al. |
| 2011/0004498 A1 | 1/2011 | Readshaw |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0153384 A1 | 6/2011 | Horne et al. |
| 2011/0161137 A1 | 6/2011 | Ubalde et al. |
| 2011/0173093 A1 | 7/2011 | Psota et al. |
| 2011/0208565 A1 | 8/2011 | Ross et al. |
| 2011/0213655 A1 | 9/2011 | Henkin |
| 2011/0218955 A1 | 9/2011 | Tang |
| 2011/0219295 A1* | 9/2011 | Adams .............. G06F 17/00 715/234 |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0314007 A1 | 12/2011 | Dassa et al. |
| 2011/0314024 A1 | 12/2011 | Chang et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0116828 A1 | 5/2012 | Shannon |
| 2012/0131512 A1 | 5/2012 | Takeuchi et al. |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2014/0012796 A1 | 1/2014 | Petersen et al. |
| 2014/0040371 A1 | 2/2014 | Gurevich et al. |
| 2014/0058914 A1 | 2/2014 | Song et al. |
| 2014/0068487 A1 | 3/2014 | Steiger et al. |
| 2014/0089339 A1 | 3/2014 | Siddiqui et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |

(56) References Cited

U.S. PATENT DOCUMENTS

| | | |
|---|---|---|
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0258246 A1 | 9/2014 | Lo Faro et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0135256 A1 | 5/2015 | Hoy et al. |
| 2015/0188872 A1 | 7/2015 | White |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0026923 A1 | 1/2016 | Erenrich et al. |
| 2016/0055501 A1 | 2/2016 | Mukherjee et al. |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2988258 | 2/2016 |
| WO | WO 2005/116851 | 12/2005 |

OTHER PUBLICATIONS

Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Capptain—Pilot Your Apps, <http://www.capptain.com> Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved May 18, 2015.
Chaudhuri et al., "An Overview of Business Intelligence Technology," Communications of the ACM, Aug. 2011, vol. 54, No. 8.
Cohn, et al., "Semi-supervised clustering with user feedback," Constrained Clustering: Advances in Algorithms, Theory, and Applications 4.1 (2003): 17-32.
Countly Mobile Analytics, <http://count.ly/> Printed Jul. 18, 2013 in 9 pages.
Distimo—App Analytics, <http://www.distimo.com/app-analytics> Printed Jul. 18, 2013 in 5 pages.
Ferreira et al., "A Scheme for Analyzing Electronic Payment Systems," Brasil 1997.
Flurry Analytics, <http://www.flurry.com/> Printed Jul. 18, 2013 in 14 pages.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services", HiPC 2006, LNCS 4297, pp. 277-288, 2006.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
McClave et al., "Statistics for Business and Economics", 2001, pp. 86-96.
Mixpanel—Mobile Analytics, <https://mixpanel.com/> Printed Jul. 18, 2013 in 13 pages.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in 18 pages.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Sigrist, et al., "Prosite, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.

* cited by examiner

GRAPHICAL USER INTERFACE FOR A DATABASE SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application Ser. No. 62/509,634 entitled "Graphical User Interface for a Database System" filed May 22, 2017, which is hereby incorporated by reference in its entirety.

BACKGROUND

In the area of computer-based platforms, a database may be queried.

SUMMARY

The systems, methods, and devices described herein each have several aspects, no single one of which is solely responsible for its desirable attributes. Without limiting the scope of this disclosure, several non-limiting features will now be discussed briefly.

One embodiment includes a method for a graphical user interface to query an item database, the method comprising: receiving, from a user interface, item input comprising an item related query parameter; executing a query based at least on the item related query parameter to retrieve item results; receiving, from the user interface, supplemental input comprising an input time period and a supplemental item related query parameter; retrieving a plurality of supplemental data items based at least on the supplemental item related query parameter; identifying a first subset of the plurality of supplemental data items and a second subset of the plurality of supplemental data items according to the input time period, the first subset corresponding to a first time period, and the second subset corresponding to a second time period; determining a first efficacy indicator for the first subset and a second efficacy indicator for the second subset; determining a ranking based at least on the first efficacy indicator and the second efficacy indicator; generating, according to the ranking, a first visual representation corresponding to the first subset and a second visual representation corresponding to the second subset; arranging the first visual representation at least partly separated from the second visual representation; and presenting, in the user interface, the item results, the first visual representation, and the second visual representation, wherein the first visual representation the second visual representation are further presented with respect to a timeline indicating the first time period and the second time period, wherein the method is performed by a computer hardware processor.

In some embodiments, the method of the preceding paragraph can include a combination or sub-combination of features. Generating the first visual representation can further comprise: retrieving a default height; calculating a first height for the first visual representation, wherein the first height is further based at least on a relationship R, wherein relationship R is defined substantially as: default height*$E_1$, where $E_1$ comprises the first efficacy indicator; and adjusting the first visual representation to the first height. The ranking can comprise a first rank and a second rank, and generating the first visual representation and the second visual representation can further comprise: determining a first color or shading corresponding to at least one of the first rank or the first efficacy indicator; determining a second color or shading corresponding to at least one of the second rank or the second efficacy indicator, the second color or shading different from the first color or shading; assigning the first color or shading to the first visual representation; and assigning the second color or shading to the second visual representation. The ranking can comprise a first rank and a second rank, the first rank can correspond to the first visual representation, the second rank can correspond to the second visual representation, and arranging the first visual representation at least partly separated from the second visual representation can further comprise: determining that one of the first rank and the second rank is lower; and bringing a respective visual representation to a foreground or background, the one of the first rank and the second rank corresponding to the respective visual representation. The item results can comprise a plurality of first data value pairs, and presenting the item results in the user interface can further comprise presenting the plurality of first data value pairs as a first graph, the method can further comprise: receiving user input comprising a cumulative option selection; calculating a plurality of cumulative data value pairs, wherein calculating the plurality of cumulative data value pairs comprises: calculating a current cumulative value from a previous cumulative value and a current data value from the plurality of first data value pairs; and presenting, in an updated user interface, the plurality of cumulative data value pairs as a cumulative graph. Determining a first efficacy indicator for the first subset can further comprise: determining a first metric for the first time period and an item; determining a historical metric for another time period different than the first time period and the item; and determining a difference value between the first metric and the historical metric, wherein the first efficacy indicator is based at least in part on the difference value. Arranging the first visual representation can further comprise: retrieving a start date and an end date for the first time period; and aligning the first visual representation on the timeline according to the start date and the end date. Presenting, in the user interface, the item results can further comprise: presenting the plurality of first data value pairs as a first graph.

Another embodiment includes a system comprising: a non-transitory computer storage medium configured to at least store computer-executable instructions; and one or more computer hardware processors in communication with the non-transitory computer storage medium, the one or more computer hardware processors configured to execute the computer-executable instructions to at least: receive, from a user interface, item input comprising an item related query parameter; retrieve item results based at least on the item related query parameter; receive, from the user interface, supplemental input comprising an input time period and a supplemental item related query parameter; retrieve a plurality of supplemental data items based at least on the supplemental item related query parameter; identify a first subset of the plurality of supplemental data items and a second subset of the plurality of supplemental data items according to the input time period, the first subset corresponding to a first time period, and the second subset corresponding to a second time period; determine a first efficacy indicator for the first subset and a second efficacy indicator for the second subset; determine a ranking based at least on the first efficacy indicator and the second efficacy indicator; generate, according to the ranking, a first visual representation corresponding to the first subset and a second visual representation corresponding to the second subset; arrange the first visual representation at least partly separated from the second visual representation; and present, in the user interface, the item results, the first visual representation, and the second visual representation, wherein the first visual representation the second visual representation are further presented with respect to a timeline indicating the first time period and the second time period.

In some embodiments, the system of the preceding paragraph can include a combination or sub-combination of features. Generating the first visual representation can further comprise: retrieving a default height; calculating a first height for the first visual representation, wherein the first height is further based at least on a relationship R, wherein relationship R is defined substantially as: default height*$E_1$, where $E_1$ comprises the first efficacy indicator; and adjusting the first visual representation to the first height. The ranking can comprise a first rank and a second rank, and generating the first visual representation and the second visual representation can further comprise: determining a first color or shading corresponding to at least one of the first rank or the first efficacy indicator; determining a second color or shading corresponding to at least one of the second rank or the second efficacy indicator, the second color or shading different from the first color or shading; assigning the first color or shading to the first visual representation; and assigning the second color or shading to the second visual representation. The ranking can comprise a first rank and a second rank, the first rank can correspond to the first visual representation, the second rank can correspond to the second visual representation, and arranging the first visual representation at least partly separated from the second visual representation can further comprise: determining that one of the first rank and the second rank is lower; and bringing a respective visual representation to a foreground or background, the one of the first rank and the second rank corresponding to the respective visual representation. Arranging the first visual representation can further comprise: retrieving a start date and an end date for the first time period; and aligning the first visual representation on the timeline according to the start date and the end date. The item results can comprise a plurality of first data value pairs, and wherein one or more computer hardware processors can be further configured to at least: calculate a plurality of cumulative data value pairs, wherein calculating the plurality of cumulative data value pairs comprises: calculate a current cumulative value from a previous cumulative value and a current data value from the plurality of first data value pairs; and present, in an updated user interface, the plurality of cumulative data value pairs as a cumulative graph. Presenting, in the user interface, the item results can further comprise: presenting the plurality of first data value pairs as a first graph. Determining a first efficacy indicator for the first subset can further comprise: determining a first metric for the first time period and an item; determining a historical metric for another time period different than the first time period and the item; and determining a difference value between the first metric and the historical metric, wherein the first efficacy indicator is based at least in part on the difference value.

Another embodiment includes a non-transitory computer storage medium for storing computer executable instructions that when executed by a computer hardware processor perform operations of any of the preceding embodiments.

DETAILED DESCRIPTION

Figure 1:
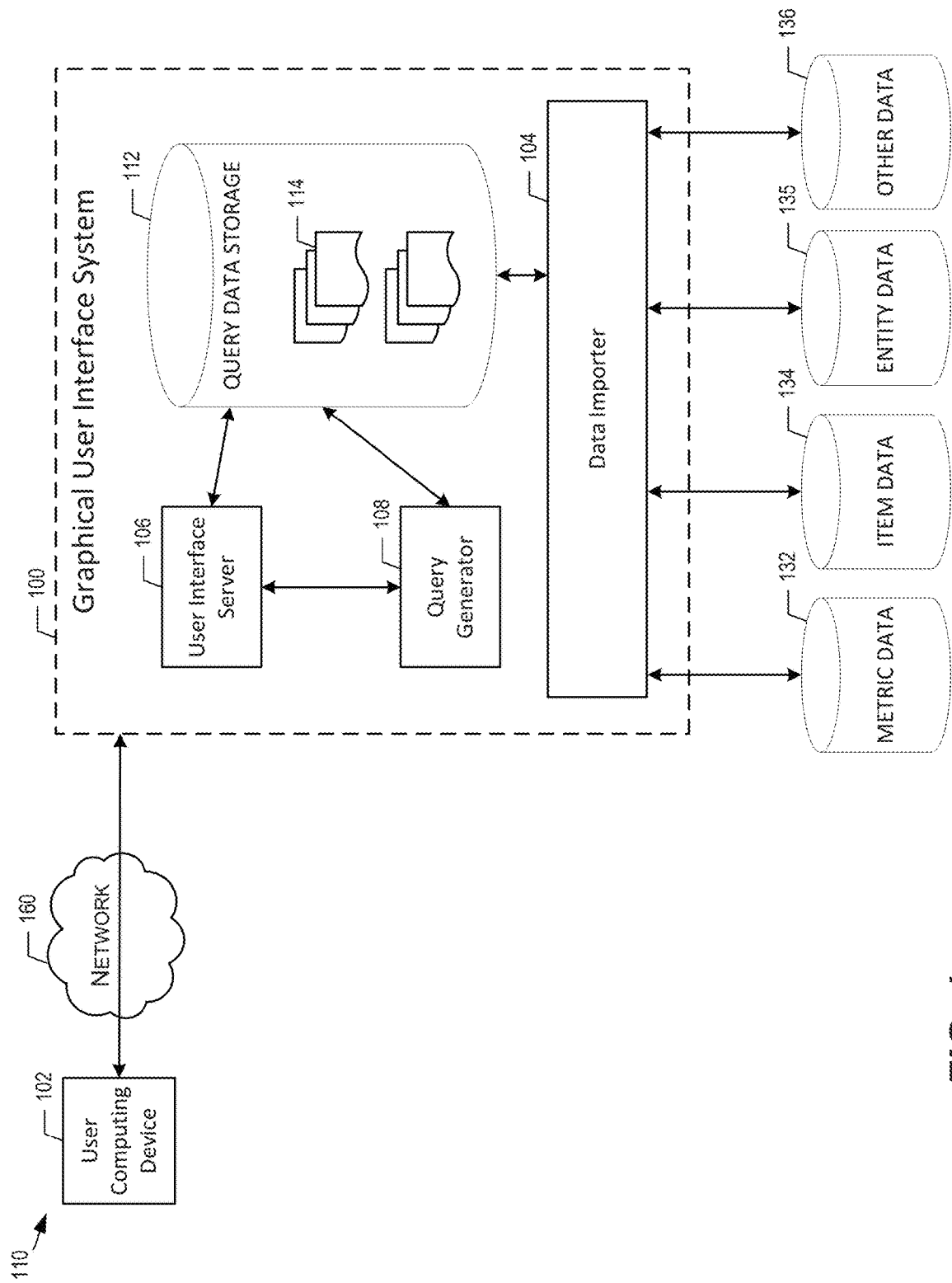
FIG. 1 is a block diagram illustrating an example graphical user interface system, according to some embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. The terms "database," "table," and "data source" may be used interchangeably in the present disclosure.

Data Store: Any computer readable non-transitory storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage). As used herein, a data source may refer to a table in a relational database, for example.

Data Object (Object), Data Item (Item), or Data Entity (Entity): A data container for information. A data object may be associated with a number of definable properties (as described herein). A data object may represent a specific thing, or a group of things, in the world. For example, a data object may represent an item such as a particular type of product, a food item, person, a place, an organization, an account, a computer, an activity, or other noun. In a food item context, an item may correspond to a specific food product. Example entities include an organization, a distribution center, a distributor, a retailer, a retailer division, a location establishment, or a store. In some embodiments, an item may correspond to a particular item identifier. In the food example, an item identifier may be a Universal Product Code ("UPC"). In some embodiments, if a food product includes an ingredient list A at time one, and the food product includes an ingredient list B at time two (which differs from ingredient list A by at least one ingredient), then the item corresponding to the food product at time one may differ from the item corresponding to the food product at time two. A data item may represent an event that happens at a point in time or for a duration. A data item may represent a document or other unstructured data source such as an e-mail message, a news report, or a written paper or article. Each data item may be associated with a unique identifier that uniquely identifies the data item. The terms "data object," "data item," "data entity," "item," "object," and "entity" may be used interchangeably and/or synonymously in the present disclosure.

Item (or Entity or Object) Type: Type of a data item (for example, Person, Event, or Document). Data item types may be defined by an ontology and may be modified or updated to include additional data item types. A data item definition (for example, in an ontology) may include how the data item is related to other data items, such as being a sub-data item type of another data item type (for example, an agent may be a sub-data item of a person data item type), and the properties the data item type may have.

Properties: Also referred to herein as "metadata" of data items. A property of a data item may include any item of information associated with, and/or relevant to, the data item. At a minimum, each property of a data item has a property type and a value or values. For example, properties associated with a person data item may include a name (for example, John Doe), an address (for example, 123 S. Orange Street), and/or a phone number (for example, 800-0000), among other properties. In another example, properties associated with a computer data item may include a list of users (for example, user1, user 2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Attribute: A string, word, group of words, and/or tag associated with an item. For example, an item, such as a candy bar, may be associated with ingredients and/or a number of descriptors, name of product, flavors, season of the product (e.g., Valentine's Day or the Fourth of July), etc. Attributes of the item describe and/or relate to the item. Example attributes for a particular item, such as a particular candy bar, may be one or more of: "crunchy," "chocolate," "peanut butter," "whole grain," "bold," "noble," "layered," etc. In some embodiments, "peanut butter" and "peanut butter" may refer to the same attribute and/or the former may refer to the presentation of the attribute in a user interface and the latter may refer to representation of the attribute in the underlying database and/or system. In some embodiments, an attribute of an item may be a property of the item. Further, one or more attributes may be associated with a particular item and/or two or more items may be associated same attribute. An example attribute may be represented by a label that corresponds to multiple words and/or phrases associated with same attribute. For example, "crumbly" may be the label for a particular attribute, which is representative of multiple words such as "crumbled," "crumbly," and "crumble." An advantage of the algorithms and/or techniques described herein is that the determined attributes may be high-level concepts associated with an item. In a food item example, attributes for a food item may correspond to concepts that are not directly related to a flavor or ingredient, such as, for example, "noble," "liberty," "peruvian," etc.

Category: The class of an item. In some embodiments, the category of an item may be a property of the item. For example, particular items may be determined to correspond to one or more categories. Continuing with the food item example, the various categories may correspond to "candy," "salty snacks," "cookie," etc. In some embodiments, an item may be determined to correspond to two or more categories. In other embodiments, categories may correspond to the particular environment such as electronics, manufacturing, or other areas.

Product: Refers to an item group. In some embodiments, "product" may be a property of the item. For example, particular items may be determined to correspond to one or more products. Two or more items may correspond to the same product. Continuing with the food example, the product may be "Acme's cookies," which may include two or more items that are associated with "Acme's cookies," but each item may have different ingredients (such as different flavors for each item), different properties, and/or item identifiers. Usage of the product grouping may allow several items and/or UPCs to be analyzed together. For example, different UPCs may refer to the regular, large, and king sizes (i.e., a pack type) of essentially the same item, and usage of the product group allows the particular items to be analyzed and/or queried together. In some embodiments, the product group may allow a broad number of items to be associated together, such as all or most of the items by a particular manufacturer, retailer, and/or organization to be grouped together. As used herein, "brand," "item group," "product," may be used interchangeably. Product and category may be similar in that each respective term refers to a higher level description of an item.

Investigation: A collection of data corresponding to a query and/or visualization. For example, the collection may correspond to a data structure that specifies one or more query parameters associated with user interface options, as described herein. The collection of data and/or parameters may be communicated and/or shared with another user or recipient. For example, the graphical user interface system may share an investigation via a uniform resource identifier with the parameters and/or a unique identifier for the particular query and/or visualization. Additionally or alternatively, a shared investigation may be available to another user and/or recipient via a user interface of a graphical user interface system. In some embodiments, the collection of data may include the results corresponding to the query and/or the results may be stored in a data source.

Supplemental (Information or Data): Any type of information and/or data that may be related to the initial data item and/or be of interest to the user. A supplemental data item may include any form of digital content. Example supplemental data includes promotional data. For example, in a product context, promotional data includes when particular programs start or end, particular entity establishments that implement the programs, particular entity establishments that do not implement the programs, associations with particular items and/or products, historical data, and/or statistically computed data from the historical data. Continuing with the promotional product example, example promotions may be 20% off program or a buy one get one free promotion for a brand, a specific product, and/or item. For example, following Valentine's Day, there may be a sale of 30% off candy bars. Additional promotional examples include placing physical signs and/or advertisements within one or more entity establishments.

Overview

Analysts may be interested in investigating enormous data sets to determine insights associated with items from the data sets. Additionally or alternatively, users may be interested in viewing integrated summary data from the enormous data sets. The data sets may be from multiple disparate data sources that include gigabytes, terabytes, or even petabytes of data. The integrated data sets may need to be queried to provide a dynamic investigation and/or summary user interface.

Disclosed herein are systems and methods that may be used to advantageously provide user interfaces that enable a user to investigate and/or view integrated data sets. The system may enable user to dynamically construct and execute one or more queries via an improved graphical user interface. For example, in addition to enabling a user to dynamically query a database and present a result set as a first visualization, such as a time series graph, the system further enables a user to select supplemental data that can be dynamically presented as a second visualization, such as one or more bar graphs, which are also presented with the first visualization. The second visualization can be dynamically generated and presented within the user interface according to a ranking. As another example, the system can dynamically present and/or generate one or more cumulative visualizations. Continuing with the cumulative example, a result set can be presented as a first visualization, such as a time series graph. Upon selection of the cumulative option, the first visualization can be transformed into a second visualization, which presents a cumulative version of the underlying data of the first visualization. Continuing with the cumulative example, the cumulative version may be a running total of the underlying data associated with the first visualization, which may enable a user to determine the velocity of a product and/or item, such as how quickly the product and/or item is being sold. As yet another example, the system can dynamically present one or more annotations that may be temporally or otherwise related to the data that is visually presented in the graphical user interface. Accordingly, a first user may share annotated data with a second user based on the annotated data being associated with a query of the second user.

Users may conduct analysis with existing graphical user interfaces such as spreadsheet applications. The existing graphical user interfaces require a user to manually integrate data and to manually correlate the data to attempt to identify patterns or insights. This approach with existing graphical user interfaces, such as spreadsheet applications, typically results in large manually constructed tables of data of many hundreds or thousands of rows. Thus, adding new data to the existing data sets may have to be manually done. Further, maintaining local databases on client computers via the existing graphical user interfaces can result in slower processing and/or error prone data analysis of the local databases. Ultimately, it may be difficult for users to identify patterns or insights at all or in a consistent manner using the existing graphical user interfaces. Further, the capability to generate visualizations with the existing graphical user interfaces may be limited or may not exist.

Accordingly, the systems and techniques described herein may improve computer technology and/or graphical user interfaces. For example, the improved graphical user interfaces may not require manual integration of data sets. The improved graphical user interfaces may enable rapid construction of database queries where the results of the queries may be dynamically presented. For example, supplemental information, such as promotional data, may be dynamically presented with the generated visualizations. In some embodiments, the supplemental information may be presented as overlay visualizations and/or the location of the supplemental visualizations may be dynamically determined based on the locations of other elements, such as other visualizations or elements, in the graphical user interface. As another example, the system can dynamically generate cumulative visualizations and/or enable the sharing of annotations, which results in an improved graphical user interface and/or an improvement in a computer's ability to display information.

The improved graphical user interface can reduce memory storage requirements and/or enable faster computer processing. For example, in some embodiments, the visualizations and/or the underlying data for the visualizations may be dynamically generated instead of being pre-calculated. Thus, instead of storing the data in non-transitory storage, the underlying data may be generated on request and/or in memory, thus reducing non-transitory storage requirements. However, in other embodiments, the underlying data may be pre-calculated. Further, the graphical user interface system may be improvement over existing graphical user interfaces, such as spreadsheets, which may require the storage of data locally on client computers instead server-side database storage in some embodiments. Thus, the graphical user interface system may result in reduced storage requirements over existing systems since the existing systems may require a local copy of the data for each client device as opposed to some embodiments that may be implemented using a client-server architecture. Likewise, a client-server architecture in some embodiments may enable faster computer processing and/or query times since some computer processing may be done server side that may employ significant computer processing resources over the client computer's resources. Further, the graphical user interface system enables a user to quickly construct and execute queries in a graphical manner as opposed to existing systems.

In some embodiments, the attribute and/or item data may be extracted from large data sources. For example, the large data sources may include item data sets in a row and columnar data format. The data from the large data sources may be processed to extract attributes and/or other data to be used in the user interfaces. Example data that may be processed includes Nielsen Product Reference Data. More information regarding attributes, the extraction of attributes, and/or the use of the attribute and/or item data may be found in U.S. patent application Ser. No. 15/077,650 entitled "Systems and Methods for Attribute Analysis of One or More Databases" filed Mar. 22, 2016 ("the '650 application"), which is hereby incorporated by reference in its entirety. For example, such details may be found in at least paragraphs [0041]-[0140], among others, of the '650 application.

Example Graphical User Interface System

FIG. 1 illustrates a graphical user interface system 100 ("GUI system 100"), according to some embodiments of the present disclosure. In the embodiment of FIG. 1, the database environment 110 includes a network 160, a GUI system 100, a user computing device 102, and data storage devices, such as a metrics data storage 132, an item data storage 134, an entity data storage 135, and/or other data storage devices 136. Various communications between these devices are illustrated. For example, the user computing device 102 may send user input, such as user interface selections, to the GUI system 100.

The example GUI system 100 includes a data importer 104, a user interface server 106, a query generator 108, and query data storage 112. The data importer 104 may import data from the item data storage 134 such as attributes and/or other item data. The data importer 104 may also import metrics and/or statistical measures from the metrics data storage 132, which may contain metrics and/or statistical measures such as sales data, inventory data, days of supply, movement data, and/or forecast data associated with the items. The data importer 104 may also import entity data from the entity data storage 135. The data importer 104 may store the data 114 in the query data storage 112. For example, the data 114 may be inserted into one or more data sources and/or tables such as an item data source, a statistical data source, and/or an entity data source. In some embodiments, a user may perform operations via the user interface server 106 such as selecting one or more user interface options and/or predefined investigations, as described herein. For example, the user interface server 106 and/or the query generator 108 may receive user input to generate a query for the query data storage 112.

Example User Interface and Querying Processes

Figure 2:
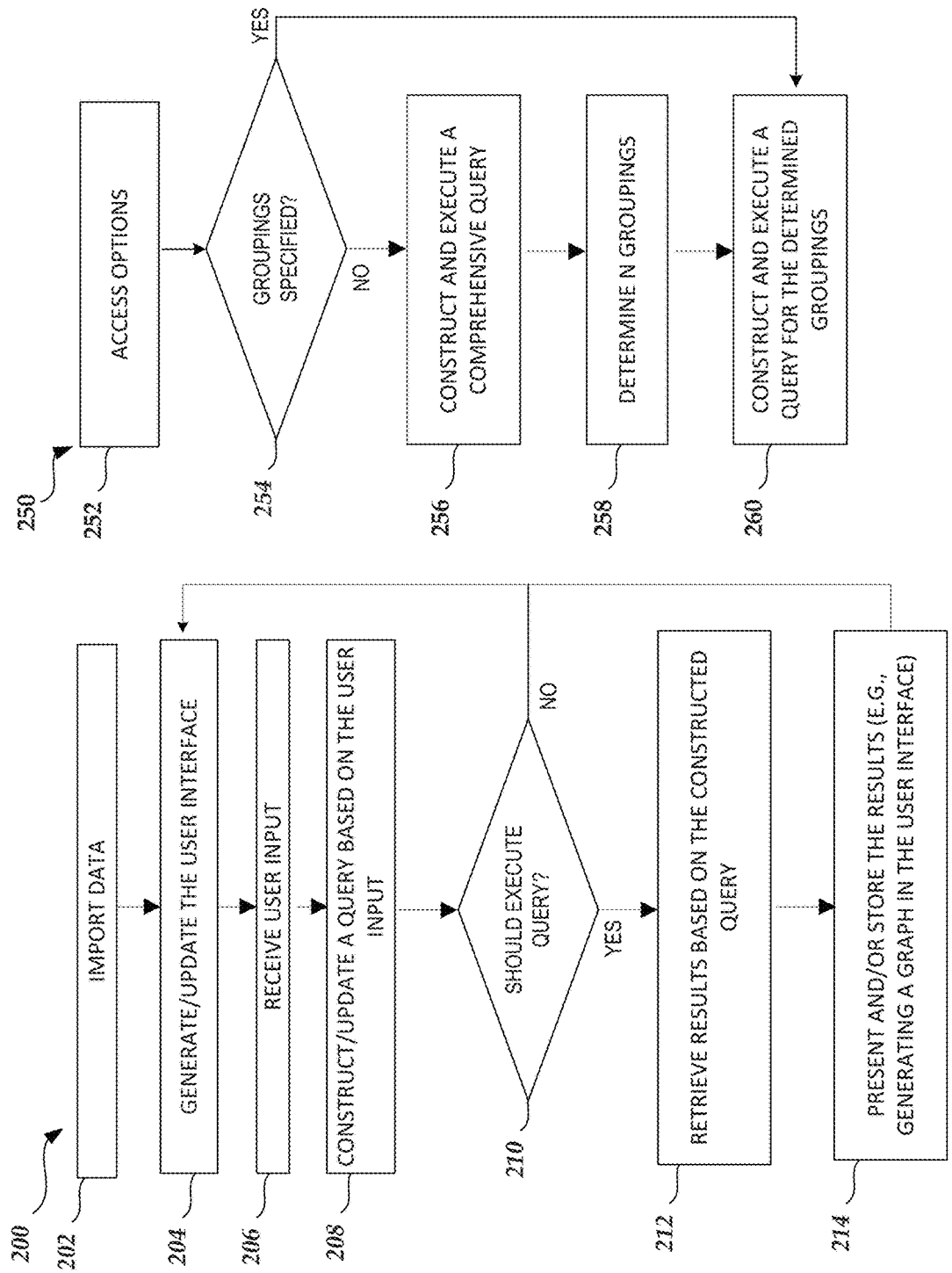
FIG. 2 are flowcharts illustrating example graphical user interface generation and querying methods, according to some embodiments of the present disclosure.

FIG. 2 are flowcharts of example methods of generating user interfaces and/or querying data, according to some embodiments of the present disclosure.

Although the method 200 is described in conjunction with the systems of FIG. 1, any system configured to perform the method, in any order, is within the scope of this disclosure. The method 200 may be performed by the various components of the GUI system 100 of FIG. 1 as discussed herein, including the data importer 104, the user interface server 106, and/or the query generator 108. Depending on the embodiment, the method 200 may include fewer or additional blocks and/or the blocks may be performed in an order different than is illustrated. Blocks of the method 200 may be similar to blocks of any other method described herein. For example, the techniques and/or algorithms of a block of the method 200 may describe the techniques and/or algorithms that can be used at a block of any other method described herein. Additionally or alternatively, the method 200 may be combined with any other method described herein.

Beginning at block 202, the data importer 104 imports data into the query data storage. Example data includes item data, entity data, metric and/or statistical data, which may originate from multiple disparate sources. The example data may be accessed and/or imported in a database format. The data importer 104 may aggregate data for importing data into the query data storage 112. Example aggregation of data includes aggregating the statistical data and/or metrics data by week or any other time period; the statistical data and/or metrics data may also be aggregated by entity, such as aggregating data at various levels: an entity level such as a distributor or retailer level, a sub-entity level such as a distributor distribution center or a retailer division, and/or a sub-sub-entity level such as a particular store. The query data storage may also include indices associated with the various data sources. Accordingly, the data importer 104 inserts data into the data sources, which in turn may update one or more indices.

In some embodiments, the data importer 104 pre-processes and/or further aggregates the data. For example, data associated with particular queries and/or visualizations may be precomputed by the data importer 104 for improvements in efficiency. For example, the data importer 104 may import data into a seasons level table, a brand level table, and a pack type table. Accordingly, where applicable, the query generator 108 may select one of the precomputed tables for the associated query if available, and the query generator 108 may use default tables if there is not a precomputed table available for the particular query.

At block 204, the user interface server 106 generates a user interface. As described herein, the generated user interfaces may enable user to query item data, entity data, statistical related data, and/or other item-related data. Example statistical related information includes statistical and/or metric data of one or more items and/or items such as days of supply, forecast movement in dollars, forecast movement in eaches, forecast movement in salable finished goods, inbound movement in dollars, inbound movement in eaches, inbound movement in salable finished goods, inventory dollars, inventory in eaches, inventory in salable finished good, and/or outbound movement in dollars, outbound movement in eaches, and/or outbound movement in salable finished goods. The example statistical related information may be stored as time series data by a unit of time such as by day, week, month, quarter, etc. Example statistical measures of the statistical related information includes a count of inventory, sales in dollars and/or other currency, and/or an average mean, median, or mode of item and/or entity data. The generated user interfaces are described in further detail with reference to FIGS. 5-8. In particular, the generated user interface may initially and/or at some point during presentation may omit or not include a data visualization. Alternatively, the generated user interface, which may include one or more panels, may be loaded from storage and/or based on pre-existing parameters, as described herein. The user interface server 106 may pre-load data from the query data storage 112 to expedite user interface searching. For example, user interface server 106 loads item, attribute, and/or entity data to enable near-instantaneous searching of those options within the user interface.

At block 206, the user interface server 106 receives the user input via the user interface. For example, a user may select one or more options within the user interface. Example options that may be selected include item options, entity options, statistical measure options, and/or miscellaneous options such as an option for filtering by year and/or grouping by some parameter. Example item options include an attribute, a brand, pack type, or UPC identifier, among others. Example entity options include specific entities that consist of establishment locations, individual establishment locations, upstream producers of items, and/or downstream distributors of those items, which may correspond to various stages of production to distribution for an item and/or an item's lifecycle. By way of a specific example of user selected options, a user may specify input options for: the "Back to School" seasonal attribute, a time period such as a particular year of interest, an entity distributor, and/or a statistical measure such as salable finished goods, which may be an indicator of inventory, as described herein. Example time periods for filtering including a period of days, weeks, months, years, and/or some combination thereof. While these options may be described in a single iteration of block 206, it will be appreciated that the collection of these options may be determined after various loops of the blocks of the example method 200, as described herein. For example, the user interface server 106 may: receive first user input, update the user interface a first time, receive second user input, update the user interface a second time, execute one or more queries based on the first and second user input, and then present the results of the queries in the user interface. Various methods for receiving user input and/or various types of user input are described in further detail with reference to FIGS. 5-8.

At block 208, the query generator 108 constructs a query based on the user input. The query generator may identify one or more data sources for one or more queries based on the user input. For example, the query generator 108 identifies one or more item data sources based on a selected item option; one or more entity data sources based on a selected the option; and/or one or more statistical data sources based on a selected statistical measure option. The query generator 108 may also determine one or more query fields based on the selected options. For example, the query generator 108 identifies a "season" field from an item table for querying based on the user selection of a season option. In some embodiments, the query generator 108 may access a data structure and/or mapping to identify one or more data sources and/or fields from the particular user input. Continuing with the specific example user input options corresponding to the "Back to School" seasonal attribute, a particular year of interest, an entity distributor, and/or a statistical measure such as salable finished goods, the query generator 108 may generate a query corresponding to joining an item data source, an entity data source, and an inventory data source to determine salable finished goods corresponding to "Back to School" items distributed by establishments of the particular entity distributor for the specified year. The example query may correspond to: "SELECT <fields> FROM item_table JOIN inventory_table on inventory_table.item_id=item_table.item_id JOIN entity_table on inventory_table.location_id=entity_table.location_id WHERE item_table.season_id=<input_season> AND entity_table.entity_id=<input_entity> AND inventory_table.date>=<input_date>". In the example query, the inventory_table is an example statistical data source. The example "SELECT . . . " query is illustrative and may not correspond to any specific programming language or be executable in the format shown. Additionally or alternatively, while the example "SELECT . . . " query is written as a single query, the query generator 108 may generate multiple queries corresponding to the example query. As described herein, the user input options may be translated and/or transformed into specific data sources and/or query parameters. Accordingly, the query generator 108 can dynamically generate queries based on the user input options. While the generation of the query may be described in a single iteration of block 210, similar to the receipt of user input options in multiple sub-iterations of the example method 200, it will be appreciated that completion of one or more queries may occur after various loops of the blocks of the example method 200, as described herein. For example, the query may be constructed after multiple loops of the example method 200 until the query is ready to be executed. As another example of multiple loops through the example method 200, the query generator 108 may: execute a first set of queries such as retrieving results corresponding to inventory for multiple entities; present first results of the first set of queries; receive second user input such as an additional filter option; execute a second set of queries corresponding to the second user input; present second results of the second set of queries, where the second results may be similar to the first results except the second results may reflect the additional filter option, for example; receive third user input, and so forth.

In generating the query, the query generator 108 may ignore some of the user selected options. For example, if a user selects "Retail Metrics" of 1) "sales (ea)", 2) days of supply, and 3) sales (dollars), then the data sets corresponding to the three statistical measures may each represent a potential axis of a visualization. Accordingly, the query generator 108 may generate a query to retrieve results corresponding to the three statistical measures such as 1) sales (eaches), 2) days of supply, and 3) sales (dollars). Below at block 214, the user interface server 106 and/or the query generator 108 may chart the three statistical measures and select two axes for presentations. In some embodiments, two statistical measures may be chosen arbitrarily, pseudo-randomly, by a predetermined method (such as selecting more commonly selected statistical measures or prioritized statistical measures and/or combinations of statistical measures), or by some other method. In other embodiments, the query generator 108 may generate a query to retrieve results corresponding to two statistical measures. In another example, the query generator 108 ignores a selected first party distribution center when the user selects a statistical measure such as "sales (eaches)." As used herein, "eaches" may refer to an item group as a unit of measure that it is stocked and/or sold at a retail establishment, for example.

"Ea" and "eaches" may be used interchangeably in the present disclosure. Salable finished goods may refer to the unit of measure in which the item is stocked at a distribution center (cases, pallets, etc.), for example. A salable finished good may be made up of one or more eaches. Accordingly, the query generator 108 may determine the axes for a particular visualization based on the user input options. Additionally or alternatively, the query generator 108 may retrieve results corresponding to multiple user options, even though the results may be incompatible for a particular visualization. In the example of retrieving results corresponding to multiple user options, the query generator 108 may then ignore some of the retrieved results if they are incompatible. In some embodiments, the user interface provides notifications to users, such as a tooltip, of incompatible user interface options and/or of sets of options that fail to return a result. Additionally or alternatively, the user interface may prevent a user from selecting incompatible filters.

At block 210, the query generator 108 determines whether to execute the one or more queries. In some embodiments, the query generator 108 determines to execute one or more queries if the queries are ready. For example, a query may not be ready to execute until a particular type of option has been selected such as a statistical measure option. If the one or more queries are ready to be executed, the query generator proceeds to block 212. Otherwise, the one or more queries are not ready and the example method 200 returns to block 204.

At block 212, the query generator 108 retrieves results based on the one or more queries. For example, the query generator 108 executes the one or more queries to retrieve the results from the query data storage 112. In some embodiments, the generated one or more queries use one or more database indices for efficient result retrieval. Continuing with the salable finished goods example, the query generator 108 executes the query to retrieve salable finished goods results. The example salable finished goods results include time series data representing inventory of goods at one or more establishments over time. Example units of time for the time series data and/or discrete data points of the time series data may correspond to daily, weekly, quarterly, annually, and or some other unit.

The query generator 108 may retrieve results from a cache if the query data is being requested for a second time. In some embodiments, the query generator 108 may cache results the first time they are retrieved and/or the first time they are retrieved for a user session. Accordingly, if the same query and/or data is requested a second time, the query generator 108 may retrieve the corresponding results the second time from a cache, which may be faster than executing the query to retrieve results from data storage.

At block 214, the user interface server 106 and/or the query generator 108 presents and/or stores the results. For example, the user interface server 106 generates a graph visualization based on the determined results at block 212. Additional information regarding generating time series visualizations, such as particular techniques, processes, and/or algorithms thereof is found in at least paragraphs [0068]-[0083], among others, of U.S. patent application Ser. No. 15/201,213 entitled "Graphical User Interface for a Database System" filed Jul. 1, 2016. Example presentations of results are described in further detail with reference to FIGS. 5-8. Additionally or alternatively, the query generator 108 may store some and/or all of the determined results in the query data storage 112.

In some embodiments, the path and/or an audit trail of an investigation may be stored. A user may duplicate one or more panels that may reflect the pattern investigation. Additionally or alternatively, the user interface server 106 and/or the graphical user interface system 100 may automatically store each revision of a panel and/or investigation. The saved revision of a panel and/or investigations may be stored in the query data storage 112. Each revision of the panel and/or investigation may include the user input selections and other data necessary to construct the panel, the investigation, and/or associated query. In some embodiments, panel data and/or investigation data may be stored in the query data storage 112 as a binary large object (BLOB). For example, each revision of a panel may be stored in the query data storage 112. Accordingly, the GUI system 100 may retrieve revisions of panels and/or investigations. Thus, the user interface server 106 may allow user to backtrack or undo user interface options using a history of user input, a breadcrumb trail of user input, and/or the BLOB revisions. In some embodiments, the GUI system 100 may automatically determine an audit trail of panels and/or user input selections that returned results.

In some embodiments, the GUI system 100 is configured to generate alerts. The GUI system 100 may execute stored queries based on some frequency and generate alerts if a query returns a result and/or the result is above or below a particular threshold. For example, a query may determine whether inventory is below a certain threshold number. In the example, the GUI system 100 may generate and send a corresponding alert to a user. In some embodiments, the GUI system 100 may send an alert via an electronic communication. The electronic communication may include a link to the user interface, which may present results associated with the alert. Additionally or alternatively, alerts may be viewed within the user interface of the GUI system 100.

The other example flowchart of FIG. 2 is an example method 250 of executing one or more queries to determine groupings of results, according to some embodiments of the present disclosure. Although the method 250 is described in conjunction with the systems of FIG. 1, any system configured to perform the method, in any order, is within the scope of this disclosure. The method 250 may be performed by the various components of the GUI system 100 of FIG. 1 as discussed herein, including the user interface server 106 and/or the query generator 108. Depending on the embodiment, the method 250 may include fewer or additional blocks and/or the blocks may be performed in an order different than is illustrated. Blocks of the method 250 may be similar to blocks of any other method described herein. Additionally or alternatively, the method 250 may be combined with any other method described herein. Aspects of the example method 250 may be described in further detail herein with reference to FIG. 8.

Beginning at block 252, the query generator 108 accesses one or more options. For example, the one or more options may correspond to user input options, as described in further detail with reference to the method 200, and in particular with reference to block 206. By way of a specific example of user selected options, the specific user options include: the "Red White & Blue" seasonal attribute, a particular year of interest, a specific entity, a statistical measure such as salable finished goods, and a compare-by-entity-division option.

At block 254, the query generator 108 determines whether groupings have been explicitly specified. For example, in the case of the specific example of the "Red White & Blue" set of options, the query generator 108 determines that explicit groupings are unspecified and proceeds to block 206. In an alternative case, the options correspond to groupings that may be selected by user. For example, the options correspond to different divisions of a particular entity: "GroceryPlus_South," "GroceryPlus_NE," "GroceryPlus_West," etc. Accordingly, if the options "GroceryPlus_South" and "GroceryPlus_NE" have been selected along with a corresponding compare-by-entity-division option, the query generator 108 determines that explicit groupings have been specified and proceeds to block 256.

At block 256, the query generator 108 constructs and/or executes a comprehensive query. For example, since explicit groupings are unspecified, the query generator 108 initially generates and/or executes a query to determine one or more groupings. Continuing with the specific "Red White & Blue" set of options, the query generator 108 constructs one or more queries to determine one or more groupings. Continuing with the example, the query may determine items associated with the "Red White & Blue" seasonal attribute and/or salable finished goods, and time series data regarding inventory of those items at specific entity divisions for the particular year. In the example, where the specified entity is GroceryPlus, the query generator 108 executes and retrieves the queries time series data results for each of "GroceryPlus_South," "GroceryPlus_NE," "GroceryPlus_West," "GroceryPlus_SE," etc. The construction and/or execution of the comprehensive one or more queries may be similar to the query construction described with reference to blocks 208, 210, and/or 212 of the method 200. In some embodiments, the comprehensive query may include a "GROUP BY" SQL function to retrieve the data in groups.

At block 258, the query generator 108 dynamically determines a predetermined number of groupings based on the retrieved results from block 206. For example, the blocks 256 and/or 258 may be advantageous to not overwhelm the user with visualization data and/or to increase user comprehensibility. In one example, the predetermined number of groupings may be five or six groupings; however, without such a limitation, presentation of data associated with greater than six groupings (such as fifty or one hundred groupings that correspond to fifty or one hundred different time series graph lines) may decrease user understandability and/or be detrimental to the user experience. Accordingly, example methods for determining a predetermined number of groupings include selecting the highest or lowest groupings by some statistical measure, or some other method of ranking the groupings. The query generator 108 may determine a statistical measure for each grouping, such as average mean, median, or mode; then the statistical measures for each grouping may be ranked from highest-to-lowest, lowest-to-highest, or some other ranking. In the context of data that includes multiple discrete data points for each grouping, such as time series data, taking a statistical measure may be useful to rank the groupings. For example, if the discrete data points of a first grouping correspond to (1 and 100), and the data points of a second grouping correspond to (10 and 2), then by taking the average mean of the groupings, which may correspond to 50.5 and 6 of the first and second groupings, respectively, the first grouping may receive a higher ranking than the second grouping. In some embodiments, a user input option may specify the ranking order. Continue with a specific example for inventory time series data, the average mean of inventory at each entity division or grouping ("GroceryPlus_South," "GroceryPlus_NE," etc.) may be determined for the specified time period, and the average mean (inventory over the course of a year, for example) for each of the groupings are ranked. Accordingly, the query generator 108 may select "N" (a predefined number of) groupings based on the ranking. In some embodiments, the query generator 108 may treat the remaining groupings as a discrete grouping such as an "all other" and/or miscellaneous grouping. For example, if the query generator 108 selects the top five groupings, then the query generator 108 may categorize and/or treat the remaining groupings as a sixth grouping, including aggregating and/or combining data for the remaining groupings, as described herein.

At block 260, the query generator 108 constructs and/or executes a query for the determined groupings. The construction and/or execution of a query for the determined groupings may be similar to the query construction and/or execution described with reference to blocks 208, 210, and/or 212 of FIG. 2. In the case where explicit groupings were not specified as determined at block 254 and continuing with the specific "Red White & Blue" set of options, the query generator 108 constructs one or more queries to retrieve data for each of the determined groupings (for example, the groups with the highest average means: "GroceryPlus_South," "GroceryPlus_NE," etc.) such as inventory associated with the specified items and associated with the determined groupings. Moreover, the one or more queries may retrieve data for the "all other" and/or miscellaneous grouping that may correspond to the remaining groupings and the data may be aggregated as one grouping. Accordingly, the one or more queries may correspond to "second" queries and/or subqueries after blocks 256 and 258 that dynamically determined a predetermined number of groupings with the "first" query and/or subquery. In the alternative case where explicit groupings were specified at block 254, the one or more queries at block 260 may correspond to a "first" query of the previously specified groupings. For example, where the options "GroceryPlus_West" and "GroceryPlus_East" were selected, one or more queries would be executed to retrieve data associated with the "GroceryPlus_West" and "GroceryPlus_East" entity divisions. Example data that may be retrieved by the example method 250, and in particular block 260, are described in further detail with reference to FIG. 8. In some embodiments, the query for the determined groupings may include a "GROUP BY" SQL function to retrieve the data in groups.

In some embodiments, the GUI system 100 may enable a user to further investigate the "all other" and/or miscellaneous grouping. For example, a user may select a visualization corresponding to the miscellaneous grouping, and the user interface server 100 may cause presentation of results exclusively associated with the miscellaneous grouping. In some embodiments, presentation of the miscellaneous results may correspond to some or all of the example method 250. For example, if the miscellaneous grouping contains sub-groupings above a threshold, then the query generator 108 may conduct a comprehensive query on each of the sub-groupings to determine a predetermined number of groupings to be presented to the user, which may be similar to blocks 256 and/or 258. In this manner, a user may drill down into the miscellaneous groupings, which may cause some or all of the blocks of example methods 200 and/or 250 to execute recursively.

Figure 3:
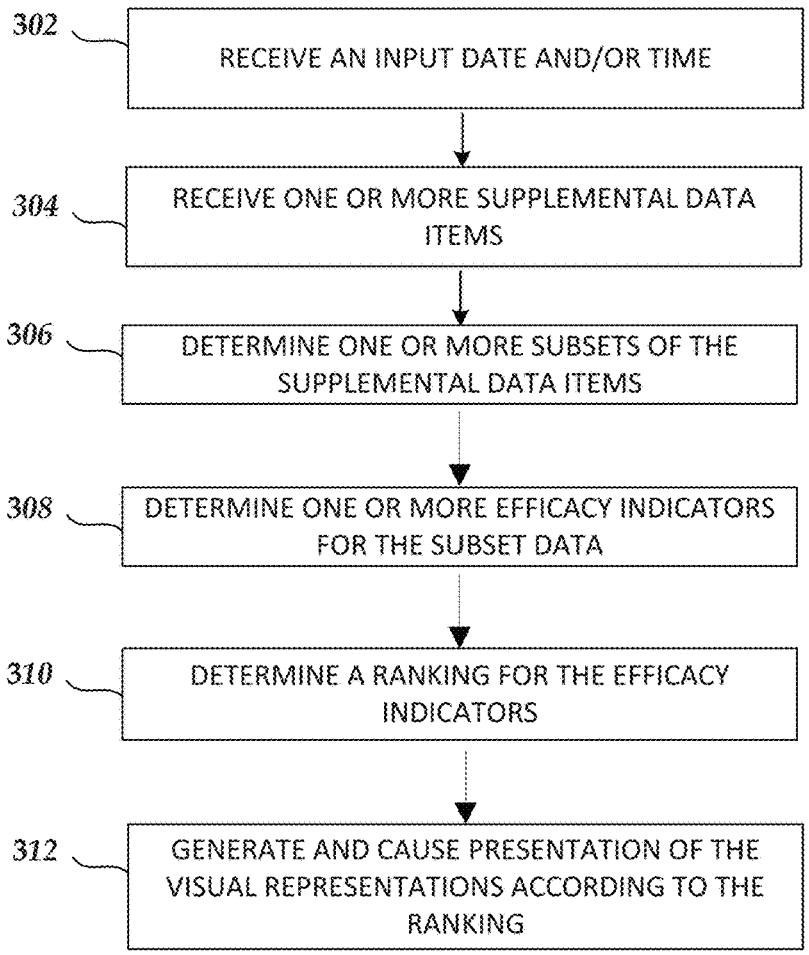
FIG. 3 is a flowchart of an example method of generating graphical user interfaces for supplemental data, according to some embodiments of the present disclosure.

FIG. 3 is a flowchart of an example method of generating user interfaces for supplemental data, according to some embodiments of the present disclosure.

Although the method 300 is described in conjunction with the systems of FIG. 1, any system configured to perform the method, in any order, is within the scope of this disclosure.

The method 300 may be performed by the various components of the GUI system 100 of FIG. 1 as discussed herein, including the data importer 104, the user interface server 106, and/or the query generator 108. Depending on the embodiment, the method 300 may include fewer or additional blocks and/or the blocks may be performed in an order different than is illustrated. Blocks of the method 300 may be similar to blocks of any other method described herein. Additionally or alternatively, the method 300 may be combined with any other method described herein. Aspects of the example method 300 may be described in further detail herein with reference to FIGS. 5 and/or 6.

Beginning at block 302, the user interface server 106 receives an input date and/or time. For example, the user interface includes a date and/or time selector that enables the user to specify an input date and/or time, which is described in further detail with respect to FIG. 5. An example date includes a user selected date of Nov. 1, 2013. In some embodiments, the input date and/or time includes a date, time range, and/or time period. Accordingly, an example date and/or time period includes Nov. 1, 2013 to Dec. 25, 2014. Additionally or alternatively, the GUI system 100 may use a default input date and/or time. An example default input date and/or time includes a predetermined date and/or time, such as the first date for which there is supplemental data. As described herein, the GUI system 100 uses the input date and/or time to determine the supplemental data for presentation. Additionally or alternatively, if an input date and/or time is not specified then the GUI system 100 may query all or some of the supplemental data.

At block 304, the user interface server 106 and/or the query generator 108 retrieves one or more supplemental data items. For example, without any input parameters, the GUI system 100 retrieves all or some default supplemental data. Using the example of FIG. 5, the GUI system 100 may retrieve supplemental data associated with a particular product and/or item, such as Acme's Cookies. As described herein, the query generator 108 generates a query with a supplemental item related query parameter, such as a particular product and/or item identifier. The example GUI system 100 retrieves the supplemental data items from the query data storage 112. Additional supplemental item related query parameters include any type of identifier, such as an entity identifier. Accordingly, the query generator 108 can retrieve supplemental data items that are associated with a particular entity identifier, for example. As described herein, example supplemental data includes promotional data that correspond to promotional programs for products and/or items such as seasonal programs, sales programs, or any other kind of program.

At block 306, the user interface server 106 and/or the query generator 108 determines one or more subsets of the supplemental data items. In the example with a time period, the user interface server 106 and/or the query generator 108 selects a subset of the supplemental data items from block 304 that correspond to the specified time period. For example, those promotional programs that fall within Nov. 1, 2013 to Dec. 25, 2014. In some embodiments, the blocks 304 and 306 may be combined. For example, the query generator 108 may generate and execute a combined query to select those data items that satisfy the input parameters. The example identified supplemental data items may be associated with time periods and/or dates. For example, where the supplemental data items include a first subset and a second subset, each of the first and second subsets may correspond to respective time periods. In the promotional programs example, a first subset of supplemental data items correspond to a promotional program with a specific time period, such as a start and end date.

At block 308, the GUI system 100 determines one or more efficacy indicators for the supplemental data, such as the subset of the supplemental data items. Example efficacy indicators include a lift metric that may correspond to sales that may be attributed to a particular promotional program. In some embodiments, the lift metric is calculated using historical data. For example, the lift for a particular program may correspond to a difference value in sales (or some other metric) between a time period that did not have a promotional program running and another time period that had the promotional program running. Another example efficacy indicator includes an execution metric that may correspond to a ratio of a number of total entities to a number of entities implementing the promotion, such as the number of total entities divided by the number of entities implementing the promotion. In some embodiments, the example efficacy indicator may be a combination of factors, such as using the execution metric to weight the execution metric.

In some embodiments, the efficacy indicator is calculated dynamically. For example, the user interface server 106 may dynamically calculate the efficacy indicator in response to a request. Additionally or alternatively, the GUI system 100 pre-calculates the efficacy indicators for the supplemental data. For example, the data importer 104 generates the efficacy indicators and stores them in the query data storage 112.

As described herein, in some embodiments, the GUI system 100 calculates multiple efficacy indicators for a subset of the supplemental data items. Continuing with the multiple efficacy indicators example, a particular promotional program may include granular data, such as data that corresponds to granular time units. Example granular time units for supplemental data includes data on a week-by-week or month-by-month basis, for example. Accordingly, the GUI system 100 can calculate multiple efficacy indicators for a single promotional program based on the granular data.

An example method for determining an efficacy indicator, such as a lift metric, uses historical data. For example, the GUI system 100, such as the data importer 104 and/or the user interface server 106, determines the products and/or items associated with the identified promotional program. The example GUI system 100 determines a metric for the products and/or items associated with the promotional program, such as sales of the products and or items. With the example metric identified, the GUI system 100 calculates a first value for the example metric and the products and/or items for a first time period that is not associated with the promotional program, such as 20 million units sold in the year 2013; and calculates a second value for the example metric and the products and/or items for a second time period corresponding to the promotional program, such as 24 million units sold in the year 2013. Thus, the GUI system 100 calculates an example lift metric by determining the difference between the first and second value, such as 4 million units. In some embodiments, the example comparison time periods include the time period preceding the time period to be analyzed (e.g., for determining a December efficacy indicator, the historical data from November may be used) and/or the time period corresponding to the same time of year (e.g., for determining a December efficacy indicator, the historical data may be used from prior December(s)). Thus, the GUI system 100 can calculate the efficacy indicator from trends. As described herein, the calculated lift may be used by the GUI system 100 to dynamically determine the presentation of the supplemental data.

Another example efficacy indicator includes a combination metric. For example, the GUI system 100, such as the data importer 104 and/or the user interface server 106, determines the execution metric. An example execution metric includes the number of total entities divided by the number of entities implementing the promotion, such as 1000 total entities divided by 500 entities implementing the promotion, which results in a weight of 2 for the execution metric. Using the previous example of the lift metric, the GUI system 100 may adjust the lift metric by the execution metric, such as by multiplying the lift metric by the execution metric. Continuing with the example, the initial lift metric (4 million) is multiplied by the execution metric (2), which results in a combined efficacy indicator of 8 million.

At block 310, the GUI system 100 determines a ranking for the efficacy indicators. In an example with two subsets of supplemental data items, such as a first promotional program and a second promotional program, and with corresponding first and second efficacy indicators, the GUI system 100 generates a ranking of the subsets by comparing the efficacy indicators. Continuing with the example, a first efficacy indicator with a score of 8 would be ranked higher than a second efficacy indicator with a score of 4.

At block 312, the GUI system 100 generates one or more visual representations corresponding to the supplemental data. In some embodiments, the GUI system 100 generates and/or causes presentation of the visual representations according to the efficacy indicators and/or the ranking. Example visual representations of the supplemental data are described herein in further detail with respect to FIGS. 5 and/or 6. Example visual representations include bar graphs that reflect the efficacy indicators and/or the ranking, such as by illustrating the bar graphs with different colors or shading and/or by presenting the bar graphs at different heights based on the efficacy indicators and/or the ranking. In some embodiments, the visual representations are presented and/or aligned with respect to a timeline that indicates time periods associated with the visual representations. Continuing with the promotional programs example, a visual representation corresponding to the promotional program can be dynamically presented as a bar graph on a timeline that indicates the start and end dates for the promotional program.

In some embodiments, the GUI system 100 dynamically calculates a height for a visual representation. For example, the GUI system 100 may present the visual representations at different heights to visually indicate the efficacy indicators. The example GUI system 100 retrieves a default height for the visual representations. Continuing with the example, the GUI system 100 calculates a first height for the visual representation, such as by determining the height from a relationship that generally corresponds to the default height multiplied by the efficacy indicator for the corresponding supplemental data. The GUI system 100 can present the one or more visual representations at different heights, which improves the computer and/or user interface to visually convey enhanced information regarding the supplemental data.

In embodiments with granular data for supplemental data items and/or multiple efficacy indicators for a subset of the supplemental data items, the GUI system 100 may generate multiple heights for a single visual representation based on the multiple efficacy indicators. An example of a multi-height visual representation, such as a step chart, is the example visual representation 640, which is described in further detail with reference to FIG. 6.

Additionally or alternatively, the GUI system 100 dynamically adjusts the height of the visual representations according to other factors. For example, the GUI system 100 can use a ceiling height to cap visual representations to a maximum height. Another example method for calculating the heights of the visual representations includes generating the heights based on the ranking, such as by incrementally adjusting the heights of the visual representations. For example, where there are first, second, and third visual representations with a corresponding first, second, and third ranking, respectively, the GUI system 100 may incrementally assign heights to the visual representations according to the rankings, such as assigning heights in increments of 30 pixels, for example. Thus, the first, second, and third visual representations may have corresponding heights of 90 pixels, 60 pixels, and 30 pixels, for example.

Additionally or alternatively, the GUI system 100 dynamically assigns colors to the visual representations based on the ranking and/or efficacy indicators. For example, the GUI system 100 may have predetermined colors and/or shadings for particular ranges of efficacy indicators and/or for particular rankings. Continuing with the example, a higher ranked promotional program is assigned a first color and a lower ranked promotional program is assigned a different second color. As another example, the GUI system 100 dynamically calculates a color, shading, and/or hue from the efficacy indicator. For example, the GUI system 100 can dynamically determine a color for the visual representation based on a relationship that generally corresponds to multiplying the efficacy indicator by a base color value that results in an output color value. For example, the greater the efficacy indicator the darker a hue or shading for the visual representation. In some embodiments, the visual representations may be the same height.

In some embodiments, the GUI system 100 arranges the visual representations according to the ranking. For example, a higher ranked supplemental data item and/or promotional program can be brought further to the foreground. In other embodiments, a higher ranked supplemental data item and/or promotional program can be brought further to the background. Thus, where multiple visual representations are presented, the representations can be shown in a layered manner that improves the user's ability to comprehend the supplemental data. The GUI system 100 can stacks the visual representations if they are the same or different heights.

Figure 4:
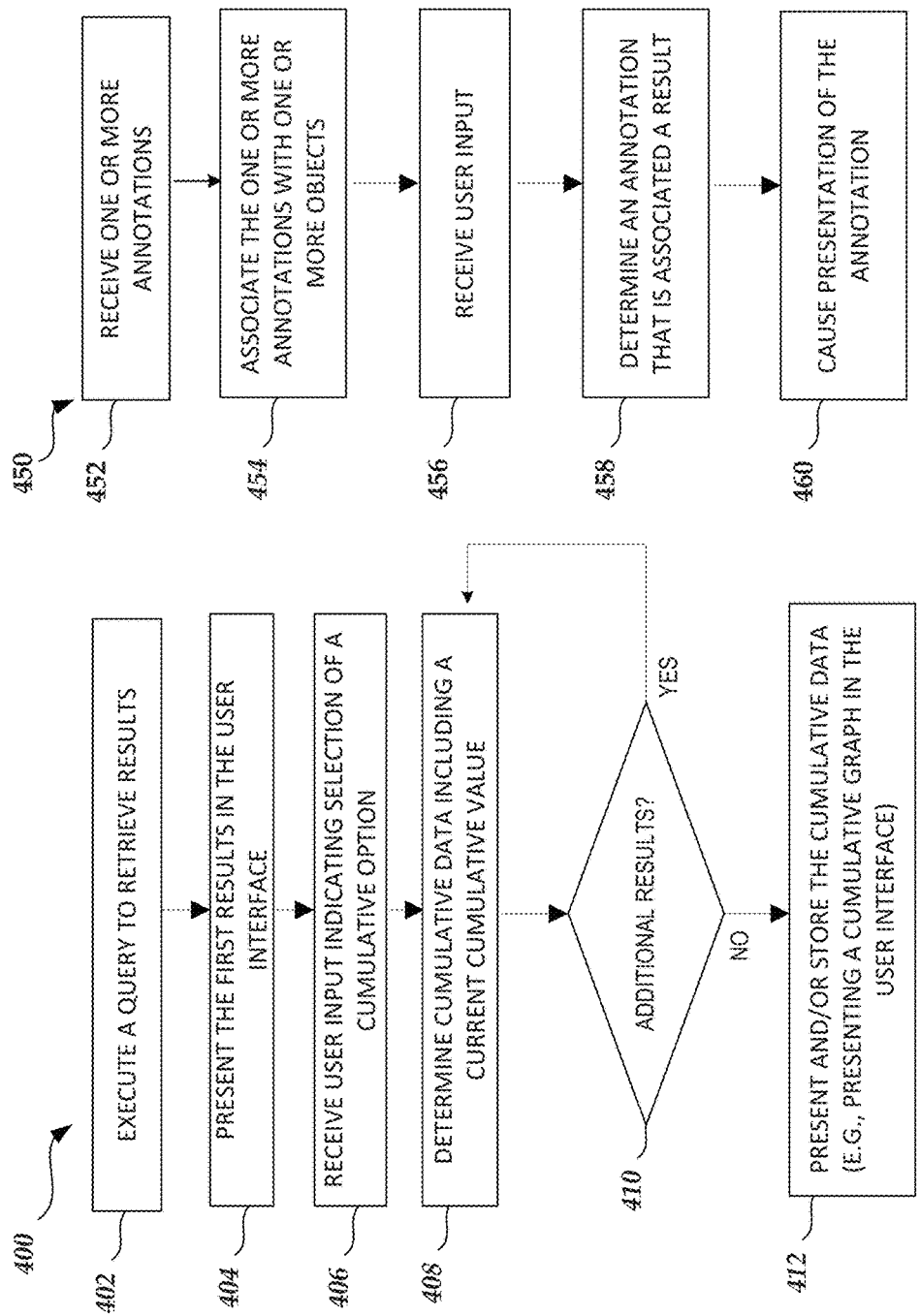
FIG. 4 are flowcharts of example methods of generating graphical user interfaces for cumulative data and for sharing annotations, according to some embodiments of the present disclosure.

FIG. 4 are flowcharts of example methods of generating user interfaces for cumulative data and for sharing annotations, according to some embodiments of the present disclosure.

Although the method 400 is described in conjunction with the systems of FIG. 1, any system configured to perform the method, in any order, is within the scope of this disclosure. The method 400 may be performed by the various components of the GUI system 100 of FIG. 1 as discussed herein, including the data importer 104, the user interface server 106, and/or the query generator 108. Depending on the embodiment, the method 400 may include fewer or additional blocks and/or the blocks may be performed in an order different than is illustrated. Blocks of the method 400 may be similar to blocks of any other method described herein. Additionally or alternatively, the method 400 may be combined with any other method described herein, such as any method of FIG. 2 (the methods 200 and/or 250), the method 300 of FIG. 3, and/or the method 450 of FIG. 4. Aspects of the example method 400 may be described in further detail herein with reference to FIGS. 7A-7B.

At block 402, the GUI system 100 executes one or more queries to retrieve one or more results. For example, the GUI system 100 executes the first query to retrieve results from the query data storage 112. Additional details regarding constructing and/or executing a query are described in further detail with respect to FIG. 2. In some embodiments, the first results include data value pairs. For example, the graph 532 of FIG. 5 visually represents a series of data value pairs and/or coordinates corresponding to a point on a first axis (such as an x, horizontal, and/or time axis) and a point on a second axis (such as a y, vertical, unit, sales, and/or metric axis).

Figure 5:
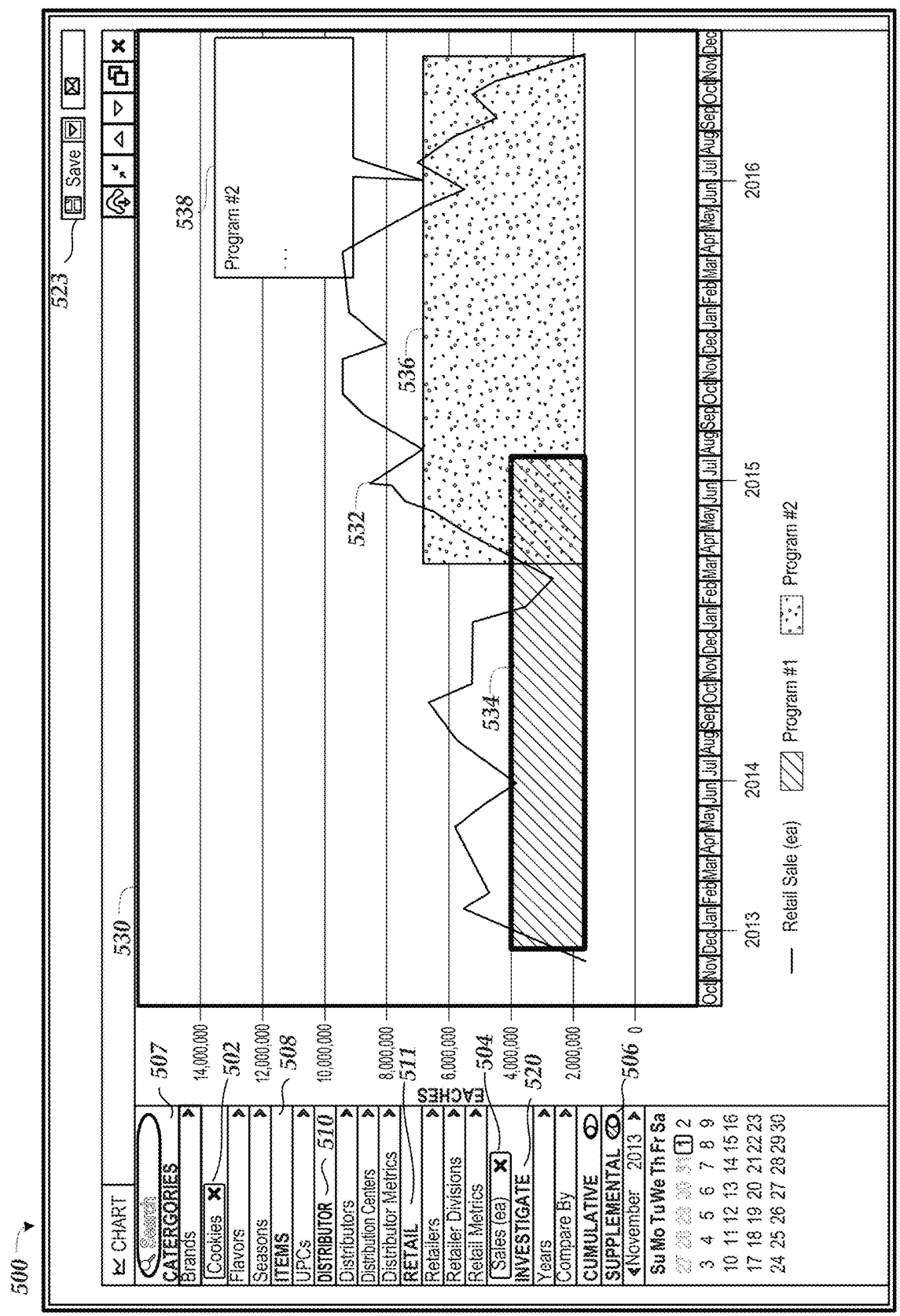
FIG. 5 illustrates an example graphical user interface for presentation of supplemental information, according to some embodiments of the present disclosure.

At block 404, the GUI system 100 presents the results in the graphical user interface. The graph 532 of FIG. 5 is an example presentation of the example results that include data value pairs. Additional details regarding presenting results are described in further detail with respect to FIG. 2. In some embodiments, the GUI system 100 presents multiple visualizations and/or graphs. Example multiple graphs are described in further detail with respect to method 250 of FIG. 2 and FIG. 8. For example, the GUI system 100 can dynamically present multiple graphs via the compare by option, as described herein.

At block 406, the GUI system 100 received user input that indicates a user selection of a cumulative option. Additional details regarding constructing and/or executing a query are described in further detail with respect to FIGS. 7A-7B. For example, a user can select the cumulative option 708 of FIG. 7A. In some embodiments, the user input further comprises a start date and/or time and/or a time period associated with the cumulative option. Thus, cumulative data may only be calculated and/or presented with respect to the specified date and/or time input.

At block 408, the GUI system 100 determines cumulative data from the one or more results. For example, the GUI system 100 generates cumulative data value pairs that correspond to accumulated data value pairs of the one or more results. In some embodiments, the data value pairs of the one or more results are filtered and/or a subset of the data value pairs are determined based on the user input, such as the time period indicated by the user selected cumulative option. An example of data value pairs of the one or more results include (time 1, $100), (time 2, $200), and (time 3, $500). The GUI system 100 determines a current cumulative data value starting with the base condition by adding a starting value to the first data value of the one or more results. In the example, a first current cumulative value would be $100 where the base condition starts with an initial value of zero because $100 plus zero is $100.

At block 410, the GUI system 100 determines if there are additional results and/or data values of the one or more results to process. For example, if there are unprocessed data value pairs from the one or more results than the GUI system 100 returns to block 408 until there are no more data value pairs to process. Continuing with the example, the GUI system 100 calculates second and third cumulative data value pairs from the previous cumulative data value pairs that may result in the cumulative data value pairs of (cumulative time 1, $100), (cumulative time 2, $300), and (cumulative time 3, $800). The GUI system 100 proceeds to block 412 when there are no more additional results and/or data values to process.

As described herein, the GUI system 100 can generate cumulative data from forecast data in a similar manner as described with respect to the method 400. In the forecast data example, the GUI system 100 may use a base condition that is greater than zero for generating the cumulative data. For example, since forecast data may have a starting point from existing historical data, the historical cumulative data can be generated for the historical data and the GUI system 100 can use the end data value from the historical cumulative data as the starting point for the forecast of data. In a specific example, where the end data value from the historical cumulative data is $800, the GUI system 100 can begin calculating the forecast data by adding the initial forecast data value to the end data value from the historical cumulative data, which is $800 in the example. In the presented user interface, there can be a visual distinction between the cumulative historic data and the forecasted data. In a visualization, the forecasted data can be presented as a dotted line and/or color-coded to emphasize its relatively uncertain nature, while sales/inventory/other concrete metrics may be presented in solid lines and/or other colors to emphasize that they are known quantities. Additional details regarding generating and presenting cumulative data and forecast data are described in further detail with respect to FIG. 7B.

In some embodiments, the GUI system 100 can dynamically generate in response to user input. In other embodiments, the GUI system 100 can pre-calculate and/or cache the cumulative data. Thus, in response to a user selection to view cumulative data, the GUI system 100 can retrieve their previously generated cumulative data from the query data storage 112.

At block 412, the GUI system 100 presents and/or stores the cumulative data. For example, the GUI system 100 can present the cumulative data value pairs as a graph in a user interface. An example cumulative graph is the graph 740 of FIGS. 7A and 7B. Additional details regarding presenting graphs and/or storing results are described in further detail with respect to FIG. 2.

In some embodiments, as described herein, cumulative data can be generated from multiple result sets that are presented in the same user interface. For example, in the compare by example described herein, multiple graphs can be displayed in the same user interface (see, e.g., FIG. 8) and the GUI system 100 can generate cumulative data for each graph of the multiple graphs. Thus, the GUI system 100 can present multiple cumulative graphs that enable user to compare cumulative data. For example, while not illustrated in FIG. 8, a cumulative graph can be generated for each of the graphs 832A, 832B, and 832C of FIG. 8.

The other example flowchart of FIG. 4 is an example method 450 for sharing annotations, according to some embodiments of the present disclosure. Although the method 450 is described in conjunction with the systems of FIG. 1, any system configured to perform the method, in any order, is within the scope of this disclosure. The method 450 may be performed by the various components of the GUI system 100 of FIG. 1 as discussed herein, including the data importer 104, the user interface server 106, and/or the query generator 108. Depending on the embodiment, the method 450 may include fewer or additional blocks and/or the blocks may be performed in an order different than is illustrated. Blocks of the method 450 may be similar to blocks of any other method described herein. Additionally or alternatively, the method 450 may be combined with any other method described herein. Aspects of the example method 450 may be described in further detail herein with reference to FIG. 8.

At block 452, the GUI system 100 receives one or more annotations. For example, a user may select the new annotation option 816 to generate new annotations. Example annotations are metadata. As described herein, an example annotation corresponds to a social media event such as a video posted by user on a particular date that is related to a particular product, item, and/or brand.

At block 454, the GUI system 100 associates the annotation with one or more objects. In some embodiments, the GUI system 100 associates the annotation with a particular date and/or time. Additionally or alternatively, the GUI system 100 receives user input indicating that the annotation is associated with any data and/or data object described herein, such as a product, item, brand, supplemental data item, and/or a promotional program. The example GUI system 100 stores the annotation and the optional one or more relationships with other data objects in the query data storage 112.

At block 456, the GUI system 100 receives user input. As described herein, example user input includes query parameters for one or more investigations, such as a query for a particular product, brand, item, season, entity, etc. Accordingly, the GUI system 100 retrieve results based on the query parameters. Additional details regarding receiving user input, executing one or more queries, and/or retrieving one or more results are described in further detail with respect to the methods 200 and/or 250 of FIG. 2, the method 300 of FIG. 3, and/or the method 400 of FIG. 4. The user input can further include a user selected option to present annotations.

At block 458, the GUI system 100 determines one or more annotations that are associated with the results. For example, an example association between an annotation and a result includes a time association. Continuing with the example, if a result is presented with a data value for March 2014 and an annotation exists that has an event date in March 2014 then the annotation may be associated with the result. Additionally or alternatively, further associations include the annotation being related to a result based on a common product, item, brand, supplemental data item, and/or a promotional program. For example, the GUI system 100 can retrieve results for a promotional program and an annotation may exist that is associated with the promotional program. In some embodiments, another example association is between an object and the annotation. For example, a graph can be associated with the brand Acme's Candy Bar object and the annotation can also be associated with the brand Acme's Candy Bar object. Thus, the GUI system 100 can cause a query of the query data storage 112 or another query server to retrieve annotations and/or metadata associated with one or more objects.

At block 460, the GUI system 100 presents the one or more annotations. Example annotations include the annotations 850A-850E that are described in further detail with respect to FIG. 8. As described herein, the presented example annotations can be shown in one or more investigations, which can result in an improved graphical user interface for sharing metadata. For example, a user may gain greater insight into the graphs and/or visualizations shown in the graphical user interface when the user is dynamically presented with metadata generated by other users that is related to their queries but the user may not have explicitly been searching for that particular metadata, such as information regarding a social media event that may explain particular entity and/or product performance on a given date or within a particular time period. In some embodiments, the annotations and/or metadata are located on a respective graph that corresponds to the object that caused the annotation to be returned from the query data storage 112 and/or another query server. For example, an annotation may be further associated with a particular date, and may be presented at the intersection of the graph at the same particular date (as well as presented in association with the graph for the particular object). Thus, the association of annotations and/or metadata with particular visualizations and/or graphs can help the user easily identify which annotations go with which visualizations and/or graphs.

Example User Interfaces

FIGS. 5-8 illustrate example user interfaces of the GUI system 100, according to some embodiments of the present disclosure. In particular, FIGS. 5-8 illustrate example user interfaces of the GUI system 100 that enable a user to investigate and/or view integrated data sets of items, attributes, categories, entities, statistics, and/or other data. In various embodiments, aspects of the user interfaces may be rearranged from what is shown and described below, and/or particular aspects may or may not be included. However, the embodiments described below in reference to FIGS. 5-8 provide example user interfaces of the GUI system 100. The user interfaces of FIGS. 5-8, such as, user interfaces 500, 600, 700, 750, and 800, respectively, may have similar user interface elements and/or capabilities.

Figure 6:
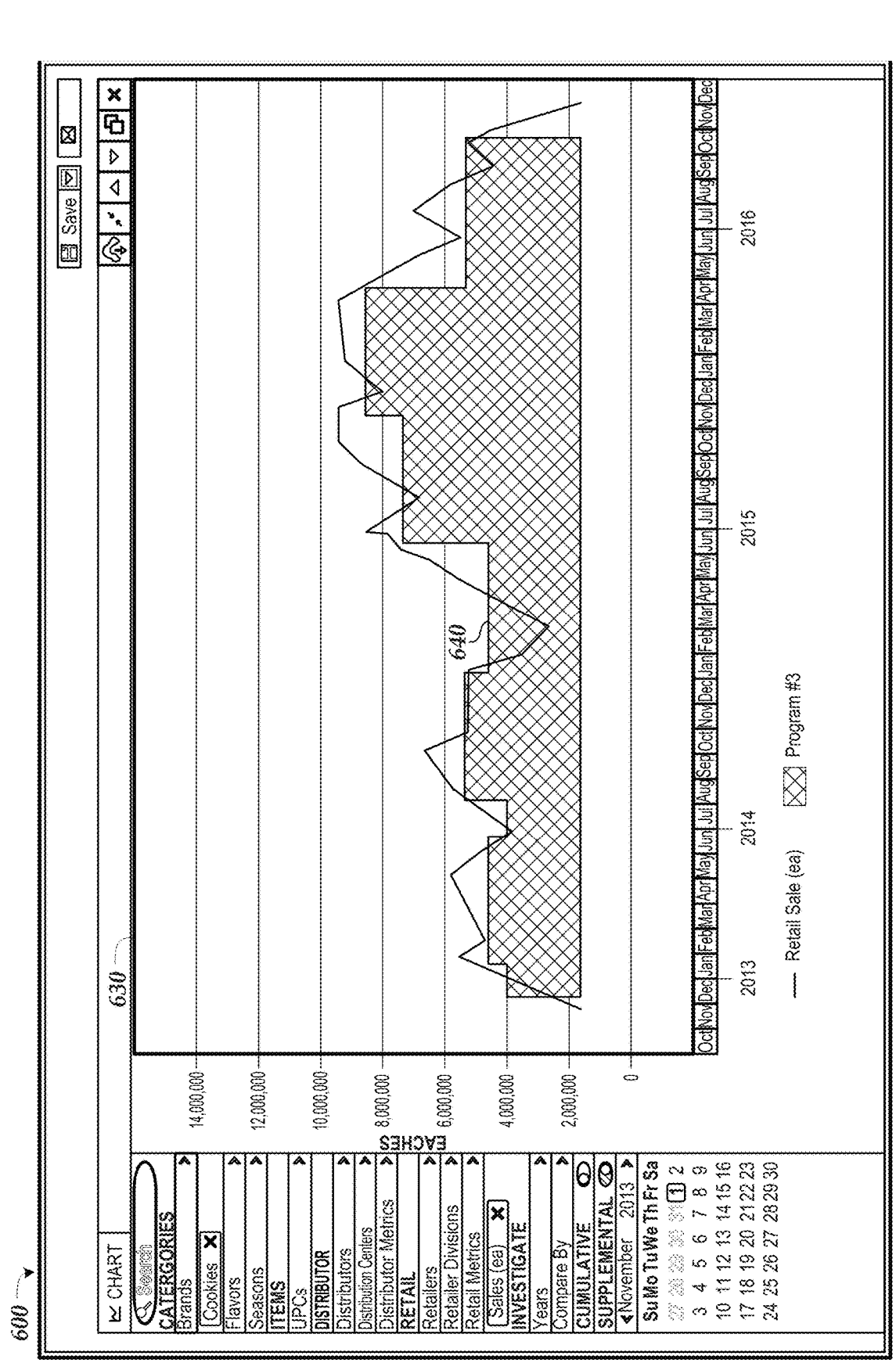
FIG. 6 illustrates another example graphical user interface for presentation of supplemental information, according to some embodiments of the present disclosure.

FIGS. 5 and 6 illustrate the example user interfaces 500 and 600 of the GUI system 100 that enables graphical supplemental information to be dynamically presented. Functional aspects of the example user interfaces 500 and 600 may correspond to any method described herein, such as any method of FIG. 2 (the methods 200 and/or 250), the method 300 of FIG. 3, and/or any method of FIG. 4 (the methods 400 and/or 450).

In FIG. 5, the example user interface 500 includes an item group input area 507, an item input area 508, a first and second entity and statistical measure input areas 510 and 511, and a miscellaneous filter area 520. In some embodiments, if there is a user interaction with the user interface 500, such as an update to the current investigation, user interface 500 presents a persist option 523 to the user to persist state associated with the user interface 500. For example, the currently selected user interface options may be persisted and/or other state associated with the user interface 500 may be persisted.

FIG. 5 illustrates example user interface selections of user interface 500. As illustrated, in the example the user has selected the "Cookies" option 502 that corresponds to a particular product, such as Acme's Cookies. In the example, another selected option includes the statistical measure input option of "Sales (ea)" and/or eaches 504. Continuing with the example, the supplemental information option 506 has been selected. The example supplemental information option 506 includes a date and/or time selector that enables a user to select a particular date and/or time and/or date and/or time range. In the example, Nov. 1, 2013, has been selected that indicates a start date associated with the supplemental data.

Accordingly, the user interface 500 dynamically presents the results of one or more queries within the visualization area 530 based on the selected user interface options. The example visualization includes a graph 532, such as a time series graph, and a first visual representation 534 and a second visual representation 536. As illustrated, the user interface 500 depicts the time series graph 532 indicating the query results for the particular item and/or product 502, which may correspond to Acme's Cookies, and for "sales (eaches)" (a unit of measure indicating items that are stocked and/or sold at a retail establishment). Further, based on the user interface selections, the user interface 500 depicts the first and second visual representations 534 and 536 that correspond to supplemental promotional data that may have been dynamically generated by the user interface 500. As illustrated in this example, the improved display and the user interface system enables the user to assess the efficacy of one or more promotional programs. For example, as described herein, the relative height of each visual representation 534 and 536 may correspond to a metric, such as a calculated lift execution metric. Thus, the one or more graphs and/or visualizations in the user interface 500 in combination with the visual representation 534 and 536 may enable user to assess the efficacy of the one or more promotional programs.

In some embodiments, the user interface 500 presents additional supplemental information via the supplemental element 538. In the example, the user interface 500 dynamically presents additional supplemental information related to the promotional program #2 based on a user selection of the second visual representation 536. The ellipsis of the supplemental element 538 indicates that any supplemental information may be presented within the element. The additional supplemental information may include data such as, but not limited to, when the program started or ended, locations that implement the program, locations that do not implement the program, associations with particular items and/or products, historical data, and/or statistically computed data from the historical data, such as a lift execution metric.

In some embodiments, the user interface 500 includes options to select and/or filter the supplemental information. For example, in FIG. 5, the user interface 500 may include options to select programs #1 and #2 for multiple programs (not illustrated). Additionally or alternatively, the user interface 500 may dynamically determine the programs that are associated with the selected user interface options, such as item, product, and/or entity options. For example, the programs #1 and #2 may be specifically associated with the selected Acme's Cookies brand 502, and, therefore, the user interface 500 may dynamically present supplemental information associated with those programs. Further, once determined and/or presented, a user may optionally select either program #1 or program #2 that automatically causes the user interface 500 to update accordingly.

FIG. 6 illustrates the example user interface 600 that enables the dynamic presentation of additional graphical supplemental information. The user interfaces 500 and 600 of FIGS. 5 and 6, respectively, may have similar user interface elements and/or capabilities. Similar to the user interface selections and/or visualizations of FIG. 5, the user interface 600 represents example user interface selections of: a particular product and/or item, which may correspond to Acme's Cookies, for "sales (eaches)," and the supplemental information option.

Accordingly, the user interface 600 dynamically presents the results of one or more queries within the visualization area 630 based on the selected user interface options. The example visualization includes a graph and a visual representation 640. The visual representation 640 may be similar to the visual representations 534 and 536 of FIG. 5. In some embodiments, the visual representation 640 differs from the visual representations 534 and 536 in that the visual representation 640 presents a step chart in contrast to the example constant bar charts 534 and 536 of FIG. 5. Continuing with the example, the user interface 600 includes supplemental information that may be calculated particular time intervals, such as daily, weekly, or monthly supplemental data. Accordingly, the example visual representation 640 represents more granular supplemental data than the corresponding supplemental data of the visual representations 534 and 536.

Figure 7A:
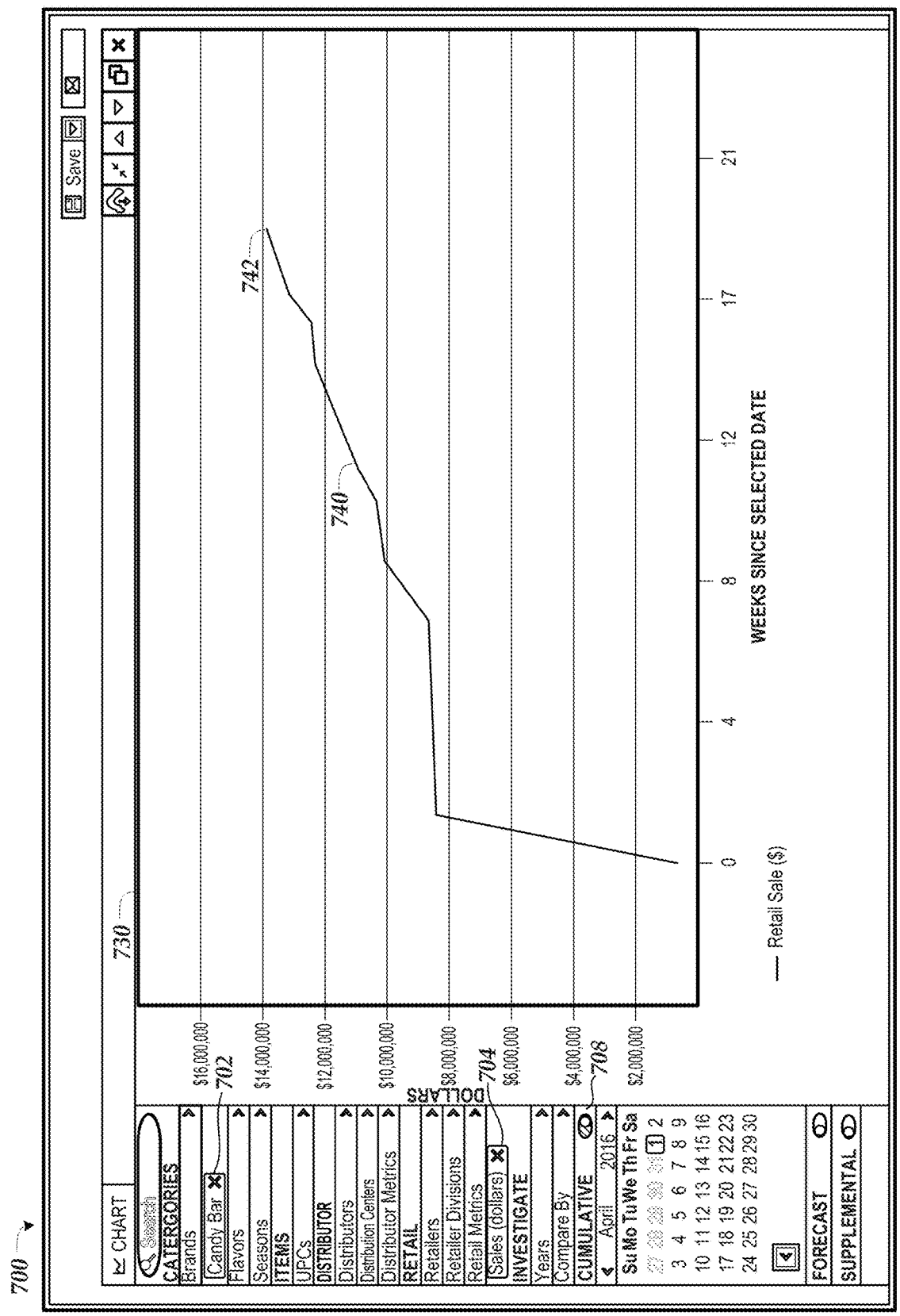
FIGS. 7A and 7B illustrates an example graphical user interface for presentation of cumulative and/or forecast information, according to some embodiments of the present disclosure.

FIG. 7A illustrates the example user interface 700 that enables the dynamic presentation of cumulative information. The user interfaces 500 and 700 of FIGS. 5 and 7A, respectively, may have similar user interface elements and/or capabilities. As illustrated, in the example the user has selected the "Candy Bar" option 702 that corresponds to a particular product, such as Acme's Candy Bar. In the example, another option includes the statistical measure input option 704 of Sales (dollars). Continuing with the example, the cumulative information option 708 has been selected. The example cumulative information option 708 includes a time selector, which may be similar to the time selector of the supplemental information option 506 of FIG. 5. Accordingly, the time selector of the cumulative information option 708 enables a user to select a particular date or time, and/or date or time range. In the example, Apr. 1, 2016, has been selected that indicates a start date associated with the underlying data for the cumulative option.

Accordingly, the user interface 700 dynamically presents the results of one or more queries within the visualization area 730 based on the selected user interface options. The example visualization includes a cumulative visualization 740, such as a time series graph. As illustrated and described herein, the user interface 700 determines query input parameters corresponding to the example user input options of a particular item and/or product 702, which may correspond to Acme's Candy Bar, and for a statistical measure, such as Sales (dollars), and a particular date/time and/or date/time range. Accordingly, while not illustrated, the user interface 700 may present a first visualization corresponding to sales for a particular item and/or product, which may be similar to the visualization 532 of FIG. 5. In response to the user selection of the cumulative information option 708, the user interface 700 presents a cumulative visualization, such as a cumulative graph, from the previous input options. As described herein, in some embodiments, the cumulative visualization is dynamically generated from a running total of the previous result data set. For example, if the first, second, and third months' data corresponds to $100, $200, $500, respectively, then a cumulative visualization may correspond to a running cumulative total of $100, $300, and $800 for the first, second, and third months respectively. Additionally or alternatively, the cumulative graph the pre-calculated and/or retrieved from memory instead of being dynamically calculated. As illustrated in this example, the improved display and the user interface system enables the user to conduct investigations, such as determining the velocity of a product and/or item. An example velocity of a product and/or item includes how quickly the item and/or product is selling.

Figure 7B:
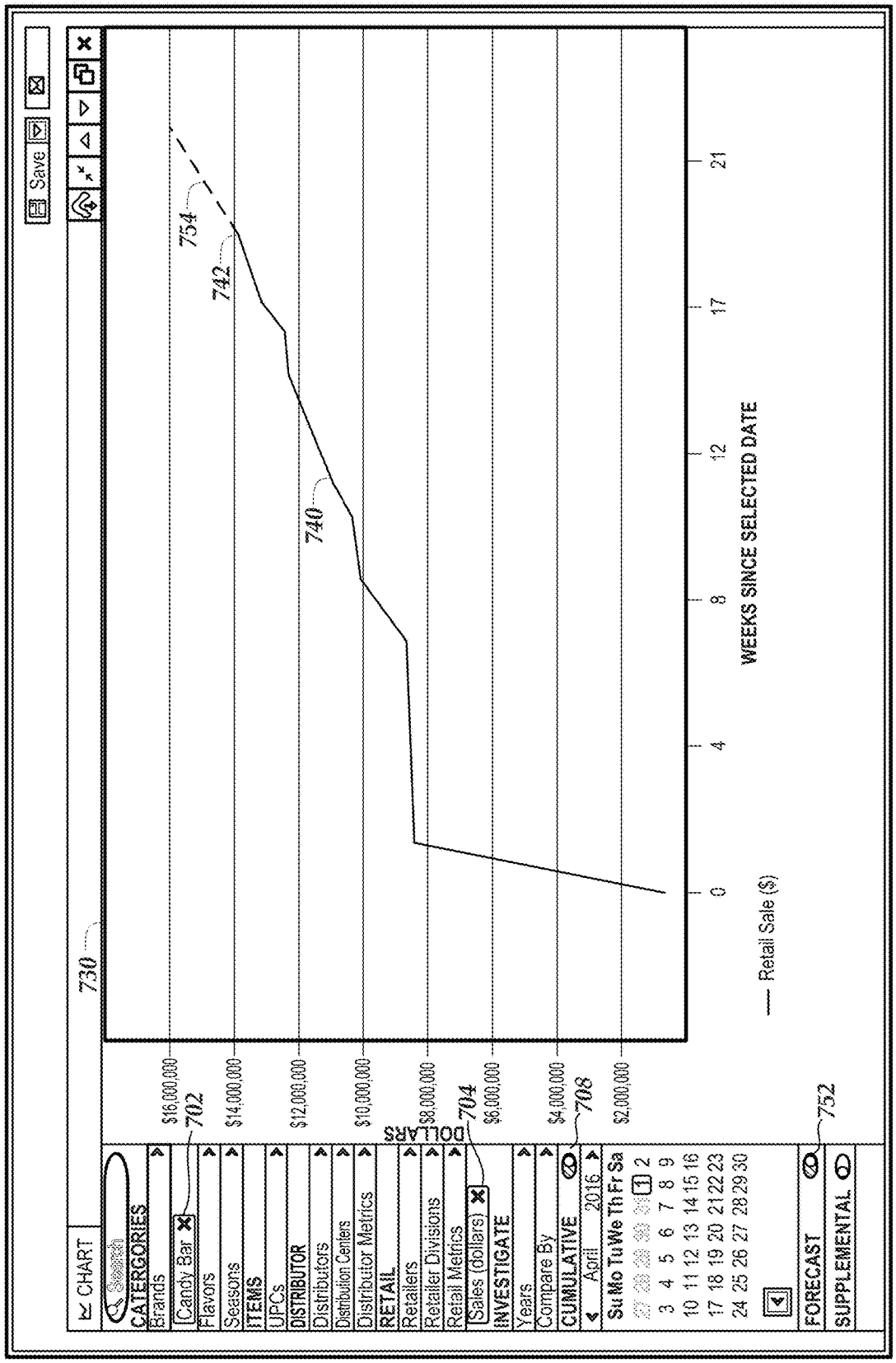

FIG. 7B illustrates the example user interface 750 that enables the dynamic presentation of cumulative and forecast information. The user interfaces 700 and 750 of FIGS. 7A and 7B, respectively, may have similar user interface elements and/or capabilities. As illustrated, the user has selected the "Candy Bar" option 702 that corresponds to a particular product, such as Acme's Candy Bar. Additional selected options include the statistical measure input option 704 of Sales (dollars) and the cumulative information option 708. The example cumulative information option 708 includes a time selector, which may be similar to the time selector of the supplemental information option 506 of FIG. 5. Accordingly, the time selector of the cumulative information option 708 enables a user to select a particular date or time, and/or date or time range. In the example, Apr. 1, 2016, has been selected that indicates a start date associated with the underlying data for the cumulative option. As illustrated, the forecast option 752 can also be selected.

In response to the selection of the cumulative information option 708, the user interface 752 presents the visualization 740 that continues at the point 742 by depicting cumulative forecast data as the graph line 754 starting from the point 742. Thus, the graph line 754 may represent cumulative and forecast data. The calculation of cumulative forecast data may be similar to the calculation for other metrics data such as sales, except that the forecast data represents predicted sales or other metrics instead of historical data. There can be a visual distinction between the cumulative historic data and the forecasted data. In some embodiments, the continued visualization past the point 742 may be presented differently from the visualization 740 before the point 742, such as being color coded differently and/or shown as a dotted line in contrast to a solid line to indicate the difference between historical and forecasted data. The forecasted data can be presented as a dotted line and/or color-coded to emphasize its relatively uncertain nature, while sales/inventory/other concrete metrics may be presented in solid lines and/or one or more other colors to emphasize that they are known quantities. In other embodiments, the user interfaces 700 and/or 750 may present forecast data only instead of historical data.

Figure 8:
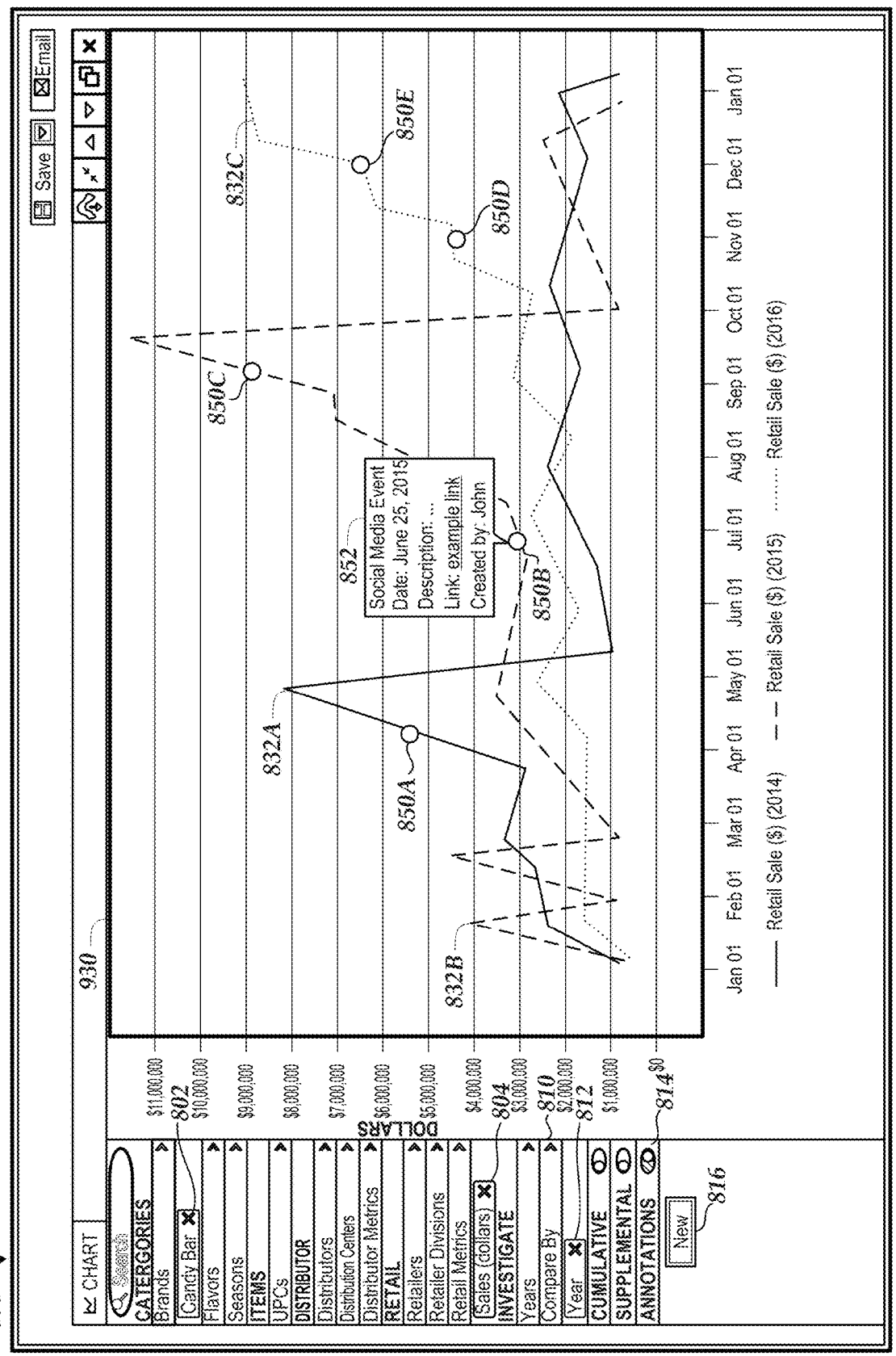
FIG. 8 illustrates an example graphical user interface for presentation of annotated information, according to some embodiments of the present disclosure.

FIG. 8 illustrates the example user interface 800 that enables the dynamic presentation of annotated information. The user interfaces 500 and 800 of FIGS. 5 and 8, respectively, may have similar user interface elements and/or capabilities. As illustrated, in the example the user has selected the "Candy Bar" option 802 that corresponds to a particular product, such as Acme's Candy Bar. In the example, another selected option includes the statistical measure input option 704 of Sales (dollars). Continuing with the example, the compare by selector 810 and the corresponding year option 812 has been selected. The example annotations option 814 has also been selected.

Accordingly, the user interface 800 dynamically presents the results of one or more queries within the visualization area 830 based on the selected user interface options. The example visualization includes a visualization 832A, 832B, and 832C, such as multiple time series graphs. As illustrated and described herein, the user interface 800 determines query input parameters corresponding to the example user input options of a particular item and/or product 702, which may correspond to Acme's Candy Bar, and for a statistical measure, such as Sales (dollars), and for determined one or more years as a result of the compare by option 812 being selected. Accordingly, the user interface 800 presents the time series graphs 832A-832C, which correspond to the years 2014, 2015, and 2016, that enable a user to compare the annual sales for the particular product and/or item.

The user interface 800 dynamically retrieves and/or presents the annotations 850A, 850B, 850C, 850D, and 850E. The example annotations 850A-850E include user generated metadata that enable users to share information that stored separately from an investigation. The example annotations 850A-850E include user generated metadata that enable users to share information that may be stored separately from an investigation. As illustrated, user selection of the annotations 850B causes presentation of the annotation detail area 852. The example annotation detail area 852 depicts an event, such as the posting of a video on a video-sharing website or a post on a social network site, on a particular date and additional details such as the user that created the event and a link to the event. Thus, a user viewing the visualization 832 may discover new insights based on the annotations 850A-850E. For example, a user may determine that the spike in the time series graph 832B after Jul. 1, 2015, may be caused at least in part by the Jul. 1, 2015 event that is visually depicted by the annotation 850B. A user may create new annotations with the element 816.

In some embodiments, an annotation may be associated with other objects or data in the graphical user interface system. For example, an annotation may be associated with supplemental information. Continuing with the example of FIG. 5, the second visual representation 536 corresponds to a promotional program and a user may generate an annotation associated with the promotional program (not illustrated). Thus, any user that generates an investigation that includes the promotional program and/or supplemental information in the result set may have the option and/or be dynamically presented with the particular associated annotation. Thus, similar to the annotations 850A-850E that enable users to share metadata information, the annotation associated with supplemental information enables users to share information and possibly cause further insights to be discovered. Additional objects or data that an annotation may be associated with include time periods. Additionally or alternatively, an annotation may be a standalone data object that is not directly associated with other objects or data.

In some embodiments, the annotations 850A-850E are located on a respective graph that corresponds to the object that caused the annotation to be returned from the query data storage 112 and/or another query server. For example, in FIG. 8, since the graph 832B has the brand Acme's Candy Bar associated with it and the annotation 850B is also associated with the brand Acme's Candy Bar, then the annotation 850B can intersect the graph 832B. Further, the annotation 850B may further be associated with the date Jun. 25, 2015, and may be presented at the intersection of the graph 832B at the same particular date. Thus, the association of annotations 850A-850E with particular visualizations and/or graphs can help the user easily identify which annotations go with which visualizations and/or graphs.

Implementation Mechanisms

The various computing device(s) discussed herein, such as the GUI system 100, the data importer 104, the user interface server 106, the query generator 108, and/or user computing device 102, are generally controlled and coordinated by operating system software, such as, but not limited to, iOS, Android, Chrome OS, Windows XP, Windows 7, Windows 8, Unix, Linux, or other compatible operating systems. In other embodiments, the computing devices may be controlled by a proprietary operating system. Conventional operating systems control and schedule computer processes for execution, perform memory management, provide file system, networking, I/O services, and provide a user interface functionality, among other things. The GUI system 100 may be hosted and/or executed on one or more computing devices with one or more hardware processors and with any of the previously mentioned operating system software.

Figure 9:
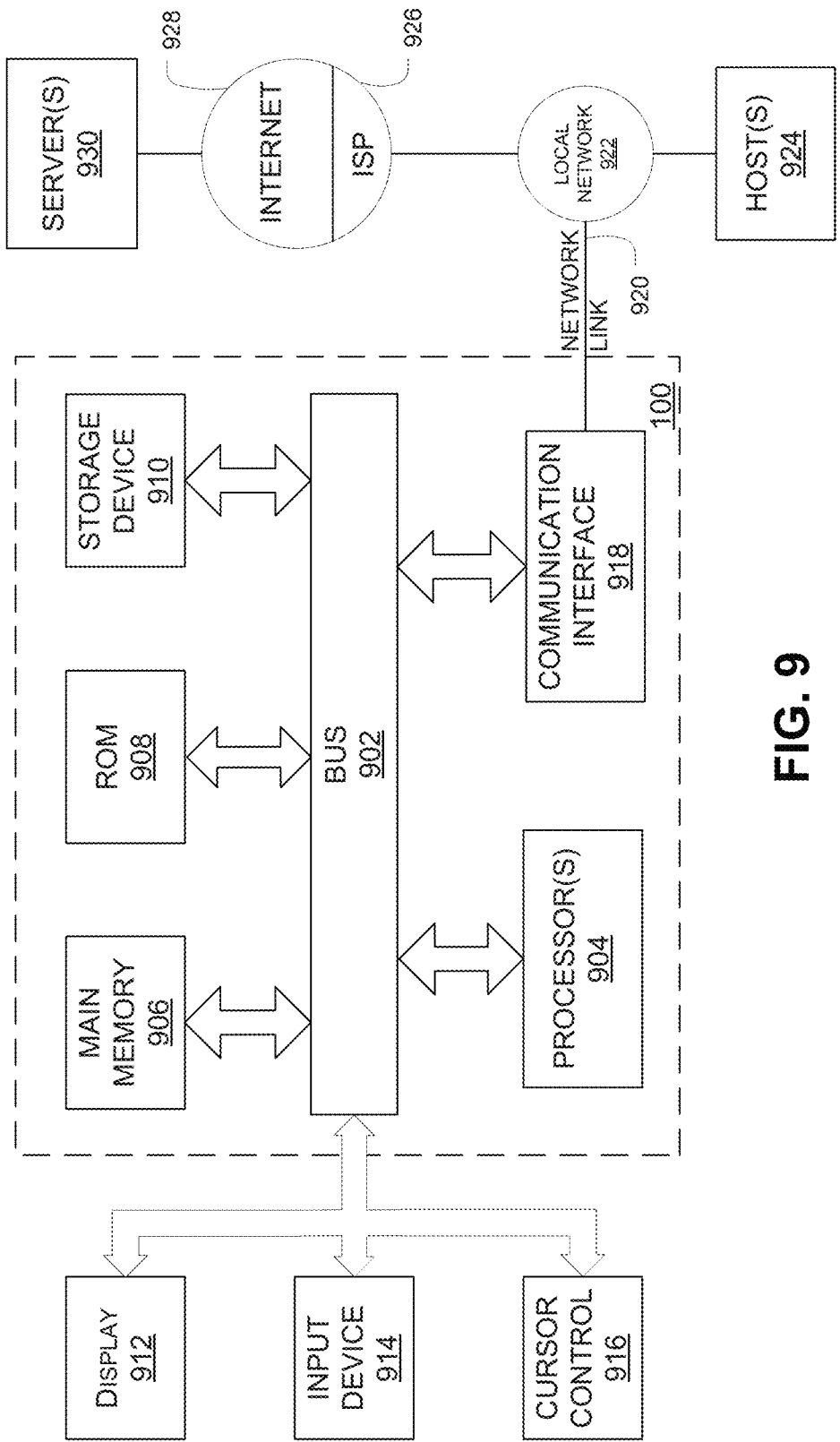
FIG. 9 is a block diagram illustrating an example graphical user interface system with which various methods and systems discussed herein may be implemented.

FIG. 9 is a block diagram that illustrates example components of the GUI system 100. While FIG. 9 refers to the GUI system 100, any of the other computing devices, modules, services, and/or user computing devices discussed herein may have some or all of the same or similar components.

The GUI system 100 may execute software, e.g., standalone software applications, applications within browsers, network applications, etc., whether by the particular application, the operating system, or otherwise. Any of the systems discussed herein may be performed by the GUI system 100 and/or a similar computing system having some or all of the components discussed with reference to FIG. 9.

The GUI system 100 includes a bus 902 or other communication mechanism for communicating information, and a hardware processor, or multiple processors, 904 coupled with bus 902 for processing information.

The GUI system 100 also includes a main memory 906, such as a random access memory (RAM), cache and/or other dynamic storage devices, coupled to bus 902 for storing information and instructions to be executed by processor(s) 904. Main memory 906 also may be used for storing temporary variables or other intermediate information during execution of instructions to be executed by processor(s) 904. Such instructions, when stored in storage media accessible to processor(s) 904, render the GUI system 100 into a special-purpose machine that is customized to perform the operations specified in the instructions. Such instructions, as executed by hardware processors, may implement the methods and systems described herein for generating user interfaces, querying data, and/or presenting visualization data.

The GUI system 100 further includes a read only memory (ROM) 908 or other static storage device coupled to bus 902 for storing static information and instructions for processor(s) 904. A storage device 910, such as a magnetic disk, optical disk, or flash drive, etc., is provided and coupled to bus 902 for storing information and instructions. The data importer 104 and/or the query generator 108 of FIG. 1 may be stored on the main memory 906 and/or the storage device 910.

The GUI system 100 and/or user computing device 102 may be coupled via bus 902 to a display 912, such as a LCD display or touch screen, for displaying information to a computer user. An input device 914 is coupled to bus 1002 for communicating information and command selections to processor 904. One type of input device 914 is a keyboard including alphanumeric and other keys. Another type of input device 914 is a touch screen.

In general, the word "instructions," as used herein, refers to logic embodied in hardware or firmware, or to a collection of software units, possibly having entry and exit points, written in a programming language, such as, but not limited to, Java, Lua, C, C++, or C#. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

The GUI system 100, or components of it, such as the data importer 104, the query generator 108, the user interface server 106 of FIG. 1, may be programmed, via executable code instructions, in a programming language.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Bus 902 carries data to main memory 906, from which the processor(s) 904 retrieves and executes the instructions. The instructions received by main memory 906 may retrieve and execute the instructions. The instructions received by main memory 906 may optionally be stored on storage device 910 either before or after execution by computer hardware processor(s) 904.

The GUI system 100 also includes a communication interface 918 coupled to bus 902. Communication interface 918 provides a two-way data communication coupling to a network link 920 that is connected to a local network 922. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from the GUI system 100, are example forms of transmission media.

A network, such as the network 160 of FIG. 1, may comprise, but is not limited to, one or more local area networks, wide area network, wireless local area network, wireless wide area network, the Internet, or any combination thereof.

The GUI system 100 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor(s) 904 as it is received, and/or stored in storage device 910, or other non-volatile storage for later execution.

In some embodiments, the GUI system 100 and/or the user computing device 102 may operate in a distributed computing environment including several computer systems that are interconnected using one or more computer networks. The GUI system 100 and/or the user computing device 102 could also operate within a computing environment having a fewer or greater number of devices than are illustrated in FIG. 1 and/or FIG. 9. Thus, the depiction of GUI system 100 and/or the user computing device 102 in FIG. 1 and/or FIG. 9 should be taken as illustrative and not limiting to the present disclosure. For example, the GUI system 100 and/or the user computing device 102 could implement various Web services components and/or peer-to-peer network configurations to implement at least a portion of the processes described herein. For example, multiple servers and/or processes may process and/or analyze items and/or present a user interface in a distributed manner, as described herein.

It will be appreciated that while the present disclosure typically discusses querying data related to food products and uses particular metrics as examples, the systems and methods described herein may be agnostic to the types of data being queried, metrics used, and/or may query data unrelated to food products, such as, electronic product databases, automobile databases, or any database of items. In some embodiments, the systems and methods described herein enable the transformation of intuitive user interface selections into dynamic queries, such that a user may search and/or analyze large integrated data sets. For example, the metrics and/or user interfaces described herein may be based on data unrelated to commerce, such as underlying criminal, cybersecurity, or governmental data, for example.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method for a graphical user interface to query an item database, the method comprising:
receiving, from a user interface, item input comprising an item related query parameter;
executing a query based at least on the item related query parameter to retrieve item results;

receiving, from the user interface, supplemental input comprising an input time period and a supplemental item related query parameter;

retrieving a plurality of supplemental data items based at least on the supplemental item related query parameter;

identifying a first subset of the plurality of supplemental data items and a second subset of the plurality of supplemental data items according to the input time period, the first subset corresponding to a first time period, and the second subset corresponding to a second time period;

determining a first efficacy indicator for the first subset and a second efficacy indicator for the second subset;

determining a ranking based at least on the first efficacy indicator and the second efficacy indicator;

generating, according to the ranking, a first visual representation corresponding to the first subset and a second visual representation corresponding to the second subset;

wherein the ranking comprises a first rank and a second rank, and wherein generating the first visual representation and the second visual representation further comprises:

determining a first color or shading corresponding to at least one of the first rank or the first efficacy indicator;

determining a second color or shading corresponding to at least one of the second rank or the second efficacy indicator, the second color or shading different from the first color or shading;

assigning the first color or shading to the first visual representation; and assigning the second color or shading to the second visual representation;

arranging the first visual representation at least partly separated from the second visual representation; and displaying on a display of the computing system, a user interface indicating the item results, the first visual representation, and the second visual representation, wherein the first visual representation and the second visual representation are further presented with respect to a timeline indicating the first time period and the second time period, wherein the method is performed by a computer hardware processor.

2. The method of claim 1, wherein generating the first visual representation further comprises:

retrieving a default height;

calculating a first height for the first visual representation, wherein the first height is further based at least on a relationship R, wherein relationship R is defined substantially as: default height*$E_1$, where $E_1$ comprises the first efficacy indicator; and adjusting the first visual representation to the first height.

3. The method of claim 1, wherein arranging the first visual representation at least partly separated from the second visual representation further comprises:

determining that one of the first rank and the second rank is lower; and bringing a respective visual representation to a foreground or background, the one of the first rank and the second rank corresponding to the respective visual representation.

4. The method of claim 1, wherein the item results comprise a plurality of first data value pairs, and wherein presenting the item results in the user interface further comprises presenting the plurality of first data value pairs as a first graph, the method further comprising:

receiving user input comprising a cumulative option selection;

calculating a plurality of cumulative data value pairs, wherein calculating the plurality of cumulative data value pairs comprises:

calculating a current cumulative value from a previous cumulative value and a current data value from the plurality of first data value pairs; and presenting, in an updated user interface, the plurality of cumulative data value pairs as a cumulative graph.

5. The method of claim 1, wherein determining the first efficacy indicator for the first subset further comprises:

determining a first metric for the first time period and an item;

determining a historical metric for another time period different than the first time period and the item; and determining a difference value between the first metric and the historical metric, wherein the first efficacy indicator is based at least in part on the difference value.

6. A system comprising:

a non-transitory computer storage medium configured to at least store computer-executable instructions; and one or more computer hardware processors in communication with the non-transitory computer storage medium, the one or more computer hardware processors configured to execute the computer-executable instructions to at least:

receive, from a user interface, item input comprising an item related query parameter;

retrieve item results based at least on the item related query parameter;

receive, from the user interface, supplemental input comprising an input time period and a supplemental item related query parameter;

retrieve a plurality of supplemental data items based at least on the supplemental item related query parameter;

identify a first subset of the plurality of supplemental data items and a second subset of the plurality of supplemental data items according to the input time period, the first subset corresponding to a first time period, and the second subset corresponding to a second time period;

determine a first efficacy indicator for the first subset and a second efficacy indicator for the second subset;

determine a ranking based at least on the first efficacy indicator and the second efficacy indicator;

generate, according to the ranking, a first visual representation corresponding to the first subset and a second visual representation corresponding to the second subset;

wherein the ranking comprises a first rank and a second rank, and wherein generating the first visual representation and the second visual representation further comprises:

determining a first color or shading corresponding to at least one of the first rank or the first efficacy indicator;

determining a second color or shading corresponding to at least one of the second rank or the second efficacy indicator, the second color or shading different from the first color or shading;

assigning the first color or shading to the first visual representation; and assigning the second color or shading to the second visual representation;

arrange the first visual representation at least partly separated from the second visual representation; and display on a display of the system, a user interface indicating the item results, the first visual representation, and the second visual representation, wherein the first visual representation the second visual representation are further presented with respect to a timeline indicating the first time period and the second time period.

7. The system of claim 6, wherein generating the first visual representation further comprises:

retrieving a default height;

calculating a first height for the first visual representation, wherein the first height is further based at least on a relationship R, wherein relationship R is defined substantially as: default height*$E_1$, where $E_1$ comprises the first efficacy indicator; and adjusting the first visual representation to the first height.

8. The system of claim 6, wherein arranging the first visual representation at least partly separated from the second visual representation further comprises:

determining that one of the first rank and the second rank is lower; and bringing a respective visual representation to a foreground or background, the one of the first rank and the second rank corresponding to the respective visual representation.

9. The system of claim 6, wherein arranging the first visual representation further comprises:

retrieving a start date and an end date for the first time period; and aligning the first visual representation on the timeline according to the start date and the end date.

10. The system of claim 6, wherein the item results comprise a plurality of first data value pairs, and wherein one or more computer hardware processors are further configured to at least:

calculate a plurality of cumulative data value pairs, wherein calculating the plurality of cumulative data value pairs comprises:

calculate a current cumulative value from a previous cumulative value and a current data value from the plurality of first data value pairs; and present, in an updated user interface, the plurality of cumulative data value pairs as a cumulative graph.

11. The system of claim 6, wherein presenting, in the user interface, the item results further comprises:

presenting the plurality of first data value pairs as a first graph.

12. The system of claim 6, wherein determining the first efficacy indicator for the first subset further comprises:

determining a first metric for the first time period and an item;

determining a historical metric for another time period different than the first time period and the item; and determining a difference value between the first metric and the historical metric, wherein the first efficacy indicator is based at least in part on the difference value.

13. A computerized method, performed by a computing system having one or more hardware computer processors and one or more non-transitory computer readable storage device storing software instructions executable by the computing system to perform the computerized method comprising:

receiving an input time period and a query parameter;

determining a plurality of data items based at least on the query parameter;

identifying a first subset of the plurality of data items and a second subset of the plurality of data items according to the input time period, the first subset corresponding to a first time period, and the second subset corresponding to a second time period;

determining a first efficacy indicator for the first subset and a second efficacy indicator for the second subset;

determining a ranking based at least on the first efficacy indicator and the second efficacy indicator;

determining a first color or shading corresponding to at least one of the ranking or the first efficacy indicator;

determining a second color or shading corresponding to at least one of the ranking or the second efficacy indicator, the second color or shading different from the first color or shading;

generating, according to the ranking, a first visual representation having the first color or shading and corresponding to the first subset, and a second visual representation having the second color or shading and corresponding to the second subset; and displaying on a display of the computing system, a user interface including the first visual representation and the second visual representation, wherein the first visual representation and the second visual representation are further presented with respect to a timeline indicating the first time period and the second time period.

* * * * *